US011599492B1

(12) United States Patent
Lee et al.

(10) Patent No.: US 11,599,492 B1
(45) Date of Patent: Mar. 7, 2023

(54) REMOTE WIPING FOR DATA TRANSPORT, STORAGE AND RETRIEVAL

(71) Applicant: SPATIAL DIGITAL SYSTEMS, INC., Agoura Hills, CA (US)

(72) Inventors: Juo-Yu Lee, Westlake Village, CA (US); Donald C. D. Chang, Thousand Oaks, CA (US); Steve K. Chen, Pacific Palisades, CA (US)

(73) Assignee: SPATIAL DIGITAL SYSTEMS, INC., Camarillo, CA (US)

( * ) Notice: Subject to any disclaimer, the term of this patent is extended or adjusted under 35 U.S.C. 154(b) by 0 days.

(21) Appl. No.: 16/181,361

(22) Filed: Nov. 6, 2018

Related U.S. Application Data

(63) Continuation-in-part of application No. 14/712,145, filed on May 14, 2015, now Pat. No. 10,120,873.

(60) Provisional application No. 62/033,627, filed on Aug. 5, 2014.

(51) Int. Cl.
| | |
|---|---|
| *G06F 16/00* | (2019.01) |
| *G06F 13/40* | (2006.01) |
| *G06F 21/60* | (2013.01) |
| *G06F 16/25* | (2019.01) |

(52) U.S. Cl.
CPC ........ *G06F 13/4022* (2013.01); *G06F 16/258* (2019.01); *G06F 21/604* (2013.01); *G06F 2213/40* (2013.01)

(58) Field of Classification Search
CPC .. G06F 13/4022; G06F 16/258; G06F 21/604; G06F 2213/40
See application file for complete search history.

(56) References Cited

U.S. PATENT DOCUMENTS

| | | | | |
|---|---|---|---|---|
| 2010/0332401 A1* | 12/2010 | Prahlad | ............... | H04L 67/1095 705/80 |
| 2011/0197740 A1* | 8/2011 | Chang | .................... | G10H 1/361 84/610 |
| 2013/0071105 A1* | 3/2013 | Chang | ................ | H04B 10/2581 398/25 |
| 2013/0219176 A1* | 8/2013 | Akella | ................... | G06F 16/185 713/165 |

\* cited by examiner

*Primary Examiner* — Alexander Khong
(74) *Attorney, Agent, or Firm* — Phuong-Quan Hoang

(57) ABSTRACT

An input switching circuit dynamically connects, based on an input mapping table, input streams to inputs of a wavefront pre-transform circuit. An output switching circuit dynamically connects, based on an output mapping table, output data at outputs of the wavefront pre-transform circuit to transport streams. A controller controls, based on a wiping command, at least one of the input and output switching circuits to alter at least one of the input and output mapping tables such that the at least one of the input and output switching circuits is disabled for connection. A first subset of the transport streams operates in a foreground mode available to a user and is transported for storage in remote storage sites at a network and a second subset of the transport streams operates in a background mode available to an administrator and is not transported for storage in the remote storage sites.

20 Claims, 20 Drawing Sheets

REMOTE WIPING FOR DATA TRANSPORT, STORAGE AND RETRIEVAL

RELATED APPLICATIONS

This application is a continuation-in-part (CIP) of U.S. patent application Ser. No. 14/712,145, filed on May 14, 2015, entitled "SURVIVABLE CLOUD DATA STORAGE AND TRANSPORT," which claims the benefit of U.S. provisional application No. 62/033,627, filed on Aug. 15, 2014, and which is also related to a non-provisional application Ser. No. 12/848,953, filed on Aug. 2, 2012, a non-provisional application Ser. No. 13/938,268, filed on Jul. 10, 2013, and a non-provisional application Ser. No. 13/953,715, filed on Jul. 29, 2013, all of which are incorporated herein by reference in their entireties. In addition, the following U.S. patent applications are referenced in this application:

1. U.S. Patent Application Publication No. 20140081989 A1, entitled "Wavefront Muxing and Demuxing for Cloud Data Storage and Transport", published on Mar. 20, 2014.
2. U.S. Patent Application Publication No. 20110197740 A1, entitled "Novel Karaoke and Multi-Channel Data Recording/Transmission Techniques via Wavefront Multiplexing and Demultiplexing", published on Aug. 18, 2011.

TECHNICAL FIELD

One disclosed aspect of the embodiments is directed to the field of data transport and storage. In particular, the embodiment is directed to remote wiping in data transport and communication using wavefront transform technology.

BACKGROUND

Remote wipe is a security feature for network or mobile devices. It allows a network administrator to delete synchronized data on a specific device. With a simple command, the network administrator can completely and remotely wipe a user's data or contents. When the information includes data that are stored in remote storage sites, the operation of remote wiping may become complicated.

The existing RAID (Redundant Array of Independent Disks) techniques have been used extensively for data storage technologies that combine multiple disk drive components into a logical unit. Data is distributed across the drives in one of several ways called "RAID levels", depending on what level of redundancy and performance (via parallel communication) is required. The techniques used to provide redundancy in a RAID array are through the use of mirroring or parity. However, RAID technology may not provide sufficient privacy and reliability in an efficient manner.

SUMMARY

An embodiment of the disclosure is a technique to perform remote wiping of data transport and retrieval using wavefront pre-processing and/or post-processing transforms. The data transport may employ a pre-processing transform to convert input streams to transport streams. The transport streams may be transported or transmitted to remote sites for storage in remote storage sites of a network. The data retrieval may employ a post-processing transform to retrieve the data stored in the remote storage sites and convert the retrieved data to the input streams.

For the pre-processing operation, a wavefront pre-transform circuit has inputs and outputs and is configured to transform input data at the inputs to output data at the outputs using a wavefront pre-processing transform. An input switching circuit is configured to dynamically connect, based on an input mapping table, input streams to the inputs of the wavefront pre-transform circuit. An output switching circuit is configured to dynamically connect, based on an output mapping table, the output data at the outputs to transport streams. A controller is configured to control, based on a wiping command, at least one of the input and output switching circuits to alter at least one of the input and output mapping tables such that the at least one of the input and output switching circuits is disabled for connection. A first subset of the transport streams operates in a foreground mode available to a user and is transported for storage in remote storage sites at a network and a second subset of the transport streams operates in a background mode available to an administrator and is not transported for storage in the remote storage sites.

Each of the output data may be a unique linear combination of the input data. The wavefront pre-processing transform may include one of an orthogonal matrix transform, a mathematical function of a non-orthogonal and full-rank matrix transform, a Hadamard transform, and a Fourier transform. At least one of the input mapping table and the output mapping table is a one-to-one mapping table. The one-to-one mapping table may include one of an arbitrary predetermined pattern, a random pattern, a perfect shuffle pattern, and a butterfly pattern. In one embodiment, the number of input streams is less than the number of transport streams. The remote storage sites may include at least a cloud storage site.

For the post-processing operation, a wavefront post-transform circuit has inputs and outputs and is configured to transform input data at the inputs to output data at the outputs using a wavefront post-processing transform. An input switching circuit is configured to dynamically connect, based on an input mapping table, input streams to the inputs of the wavefront post-transform circuit. An output switching circuit is configured to dynamically connect, based on an output mapping table, the output data at the outputs to retrieval streams. A controller is configured to control, based on a wiping command, at least one of the input and output switching circuits to alter at least one of the input and output mapping tables such that the at least one of the input and output switching circuits is disabled for connection. A first subset of the input streams operates in a foreground mode available to a user and is retrieved from remote storage sites at a network and a second subset of the transport streams operates in a background mode available to an administrator and is not retrieved from the remote storage sites.

Each of the output data is a unique linear combination of the input data. The wavefront post-transform may include one of an inverse orthogonal matrix transform, an inverse mathematical function of a non-orthogonal and full-rank matrix transform, an inverse Hadamard transform, and an inverse Fourier transform. One of the input mapping table and the output mapping table is a one-to-one mapping table. The one-to-one mapping table may include one of an arbitrary predetermined pattern, a random pattern, a perfect shuffle pattern, and a butterfly pattern. The number of retrieval streams is less than number of input streams. The remote storage sites may include at least a cloud storage site.

BRIEF DESCRIPTION OF THE DRAWINGS

Embodiments may best be understood by referring to the following description and accompanying drawings that are used to illustrate embodiments. In the drawings.

DETAILED DESCRIPTION

Figure 1:
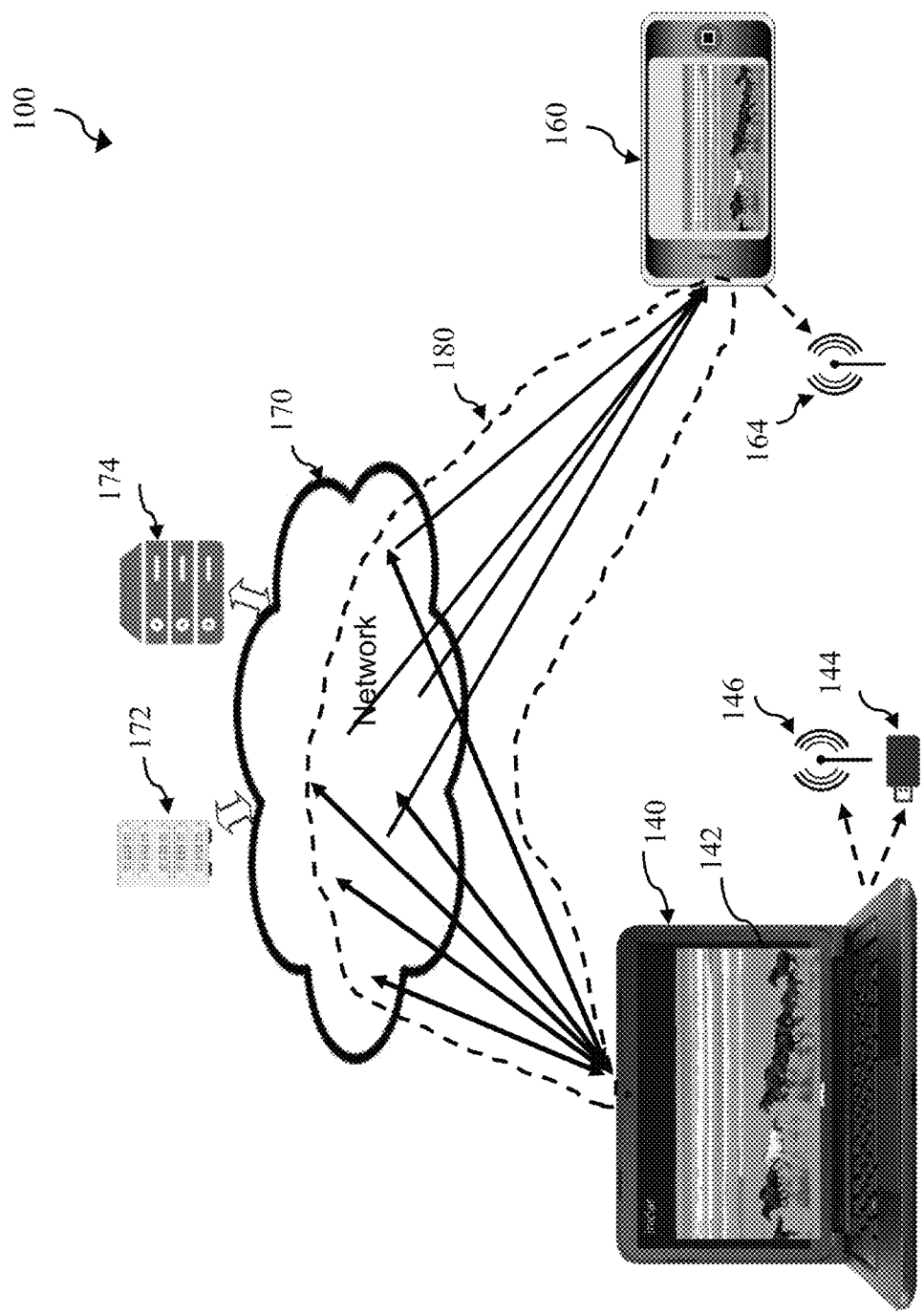
FIG. 1 is a diagram illustrating a system using a data transport and/or storage, and retrieval subsystem using wavefront transform technology according to one embodiment.

One aspect of the embodiments discloses operation concepts, methods and implementations of distributed systems via wavefront pre-tranform and post-transform, also referred to as wavefront multiplexing and demultiplexing, respectively, in cloud storage. It should be noted that the terms "multiplexing" or "demultiplexing" as used in this disclosure do not refer to the conventional meaning of data selection, data steering; rather, "multiplexing" or "demultiplexing" herein refer to transformations that take place prior to data transport, transmission, or storage and after data storage or retrieval, respectively. Accordingly, the wavefront multiplexing and demultiplexing processes may be referred to as wavefront pre-transform and post-transform, respectively.

We may use the term "writing" to refer to the act of storing data on cloud or sending data through cloud. We may also use the term "reading" to refer to the act of retrieving data from cloud or receiving data through cloud.

One disclosed aspect of the embodiments relates to distributed data storages with built-in redundancy for a single stream data subdivided into M multiple data substreams or M independent data streams, converted into wavefront pre-transformed, or wavefront muxed, domain with M+N output wavefront components (WFCs), and stored these M+N WFC output data into M+N separated data storage sets, where N and M are integers and N>0. As a result, the stored data sets are WFCs in the form of linear combinations of the data sets, instead of the data sets themselves.

Let us use an example to illustrate the proposed procedures. A data set with 4 numerical data points $\underline{S}=[1, 2, 3, 4]$ will be stored in 8 memory sets through the following procedures: (1) segmenting $\underline{S}$ into 4 segments $S_1=1$, $S_2=2$, $S_3=3$ and $S_4=4$; (2) putting $S_1$, $S_2$, $S_3$ and $S_4$ through a WF pre-transform, or WF muxing, process, based on 4 column vectors out of a 8-by-8 Hadamard matrix and then generating 8 sets of WFCs; and (3) storing the 8 sets of WFCs in 8 separated memory sets, which can be either a user's storage device or a location in his/her registered cloud space. Specifically in the aforementioned (2), the generated 8 sets of WFCs is the product of the following matrix multiplication:

$$\begin{bmatrix} 10 \\ -2 \\ -4 \\ 0 \\ 10 \\ -2 \\ -4 \\ 0 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \\ 1 & 1 & 1 & 1 \\ 1 & -1 & 1 & -1 \\ 1 & 1 & -1 & -1 \\ 1 & -1 & -1 & 1 \end{bmatrix} \begin{bmatrix} 1 \\ 2 \\ 3 \\ 4 \end{bmatrix}. \quad (1)$$

To generate the 8 sets of WFCs, we can consider the 4 segments $S_1=1$, $S_2=2$, $S_3=3$ and $S_4=4$. But we can also include more auxiliary segments whose values are known a priori in order to generate new sets of WFCs.

Upon retrieving, the data set $\underline{S}$ with 4 data points can be restored if any 4 of the 8 stored data sets are available. This represents an example of M=4 substreams transformed to 8 WFCs with "degree of shared-redundancy" N+M=8. Each substream features a unique weighting distribution in the N+M (N+M=8) memory sets. There are M (M=4) weighting components among the M (M=4) data substreams in a memory set, and these M (M=4) weighting components are different from one memory set to another. There are M weighting distributions in the M+N dimensions, which are mutually orthogonal to one another in the M+N dimensional space.

An embodiment also relates to distributed data storage systems with built-in redundancy, wherein multiple (M) independent data streams are concurrently converted into WF pre-transformed domain with M+N output WFCs, and these M+N WFC output data are stored into M+N separated data storage sets, where N and M are integers and N>0. As a result: (1) each memory set stores a weighted sum of the M independent data streams, i.e., a linear combination of all the M independent data streams, and (2) each data stream features a unique weighting distribution in the M+N memory sets. There are M such weighting distributions, which are mutually orthogonal to one another in the M+N dimensional space. Each dimension is associated to an output of the WF pre-transform processor or device.

When the input data sets of a WF pre-transform processor or device, or WF muxer, feature, say, 100 MB each, and each of the WFCs will then feature about $(1+\epsilon) \times 100$ MB. The overhead constant, $\epsilon$, can be designed to be about 15% or less. A total 400 MB data will be stored in 8 physical separated sites in a user's storage devices and/or his/her registered cloud space. Each site features a storage of the size of $(1+\epsilon) \times 100$ MB. This storage architecture via WF pre-transformation will have the following feature: (1) distributed and securely stored WFC via "summing" independent data, not encrypted nor encoded; (2) with built-in redundancy for survivability, only requiring 4 of the 8 stored WFCs to reconstruct the 4 original data sets; and (3) monitoring distributed data sets for data integrity via recovered diagnostic signals at ports of a WF post-transform, or WF demuxing, processor without examining stored data sets themselves.

Similar techniques can be applied to video streaming, secured mail services, secured file transfers, and other applications via Internet clouds. The embodiments comprise three important segments: the pre-storage processing on user end, multiple locations in user's storage devices and his/her registered cloud space, and the post-retrieval processing. We will use a single user for both pre-storage processing and a post-retrieval processing as an example for illustrating the operation concepts. In principle, the pre-storage processing and the post-retrieval processing may be in user segments and may reside on equipment on user side, or on storage operator facilities. These operators will aggregate multiple data storage sets distributed over remote networks, the user's computers and the user's storage devices.

FIG. 1 is a diagram illustrating a system 100 using a data transport, storage, and retrieval subsystem using wavefront transform technology according to one embodiment. The system 100 includes a user personal computer 140, a hand-held device 160, and a network 170.

The user computer 140 may be a typical personal computer with screen display showing a file 142. The user computer 140 may have interface to a storage device 144, such as a Bluetooth memory stick, and a Wifi device 146 for wireless communication. The user computer 140 transports the data streams to the network 170 for data storage. The user computer 140 may have instructions or programs that, when executed by a processor, perform operations related to remote wiping for wavefront pre/post-transforms as described in the following. In addition, the user computer 140 may include interface to special add-on circuits which implement remote wiping for wavefront pre/post-transforms.

The network 170 may have interfaces to a number of storage sites 172 and 174. The storage sites 172 and 174 may include at least one of a network attached storage (NAS) device, a direct access storage (DAS) device, a storage area network (SAN) device, redundant array of independent disks (RAIDs), a cloud storage, a hard disk, a solid-state memory device, and a device capable of storing data.

The hand-held device 160 may be any hand-held device having computing and network capabilities. It may be a smart phone, a notebook computer, or a pad computing device. It may also have interface to a Wifi device 164 for wireless communication to the network 170. The hand-held device 160 may retrieve the data stored in the remote storage sites 172 and 174 and reconstitute the data. For example, the data file 142 representing a video stream may be reconstituted and displayed on the display screen of the hand-held device 160. The hand-held device 160 may have instructions or programs that, when executed by a processor inside the hand-held device 160, perform operations related to remote wiping for wavefront pre/post-transforms as described in the following. In addition, the hand-held device 160 may include interface to special add-on circuits which implement remote wiping for wavefront pre/post-transforms. The data path from the user computer 140, the remote storage sites 172 and/or 174, and the hand-held device 160 may constitute a subsystem 180 which is an example of a transport, storage, and retrieval subsystem. The subsystem 180 may or may not have remote wiping capability.

FIG. 1 depicts a scenario using WF pre-transform, or WV muxing, to store personalized data on cloud. It takes advantages of many free storage spaces by various cloud storage operators. The WF pre-transform techniques effectively aggregate multiple small distributed storages to function as a large storage for a user with main features of reliability and privacy. The stored data via WF pre-transform may be configured to be accessible via Cloud from anywhere on earth at any time. For a user, a personal computer 140 at a home-base features capability of writing data to and reading data from cloud storage. We shall take advantages of "auto-synchronization" functions provided by many cloud storage venders. For writing or storing data to cloud, one may choose a large data file, segmented, and then WF pre-transformed into multiple WF-pre-transformed sub-files. Let assume that there are 4 of them; each will be put into one of 4 local files in the user computer 140; which are to be synchronized by 4 corresponding cloud storages operated by individual vendors. The WF pre-transform may be configured such that any 3 of the 4 stored sub-files are sufficient to reconstitute the original data file via a corresponding WF post-transform processor in a "data reading" process either on a PC at the home base or a mobile device 160 with reading capability anytime of a day and anywhere on earth. A handheld device may be restricted with limited viewing based on device type and number of previous viewings. It may also be programmed to feature an on-demand remote wiping capability.

The database associated with the WF pre-/post-transform for the data storage on cloud and the manager of the stored data base may be securely accessible and available to all the readers including those in PCs and those in the handheld devices. The secured accessibility may be results of transferring related database to personal devices such as USB memory stick 144 or phone 160 connected to PC by wire, or via a wireless device 146 or 164 operated in a wireless format such as Bluetooth.

In another embodiment, 4 separated and distributed storages on cloud 170 are used to save multiple data files. Suppose there are 3 different data files with comparable data sizes accessible to the user computer 140. We may WF pre-transform these 3 data files via a 4-to-4 WF pre-transform processor into 4 WF pre-transformed files. Each output file featuring a weighted sum of the three data files will be put into one of 4 local files, which are to be synchronized by 4 corresponding storage vendors via cloud. The WF pre-transform may be configured such that any 3 of the 4 stored WF pre-transformed-files are sufficient to reconstitute any one of the 3 original data files via a corresponding WF post-transform processor in a "data reading" process either on a PC at a home base or a mobile device 160 with capability of reading only from distributed cloud storage.

Furthermore, it is possible to add and store a fourth data file with the same data size by the same set of distributed cloud storages allocated for the 3 data files previously. We WF pre-transform these four (3+1) data files via a 4-to-4 WF pre-transform processor into 4 WF pre-transformed files. Each output file featuring a weighted sum of the four original data files will be put into one of 4 local files; which are to be synchronized by 4 corresponding storage vendors via cloud. The WF pre-transform may be configured such that all 4 stored WF pre-transformed-files are required to reconstitute any one of the 4 original data files via a corresponding WF post-transform processor in a "data reading" process.

The user computer 140 may have functions of a Wavefront Pre-transform Folder (WFF), and a manager for the WF Pre-transform Folder (WFF Manager). There are two screenshots from a PC (not shown). An execution command (for example, Yun_installation.exe) for a database software package embedded in a short cut has been clicked. As a result, two small icons for execution short cuts appear on the second screen showing a WF pre-transform (smart) folder, WFF, and a WFF Manager.

The associated database comprises a collection of every file's information associated with a selected WF pre-transform configuration in a writer, and shall be referred to as a writing configuration. It includes: (1) File name, file location (path), and (2) Associated wavefront component (WFC) in the outputs of the WF pre-transform, such as "yy1.mux" or "yy2.mux" as output file formats and their paths. The database must be synchronized between readers and writers. The synchronization may be via secured communications channels such as Bluetooth (private) between the home-based computers on one hand and laptop/mobile devices on the other hand. The transport/storage processing shall feature, in a default mode, automatic WF pre-transform in file storage and automatic WF post-transform in file retrieval.

The WF Pre-transform Smart Folder (WFF) will (1) appear as a normal folder (e.g. a folder-shortcut on Desktop); (2) trigger functions upon file addition or file retrieval; and (3) run at front-end. On the other hand, the WFF Manager will serve as an interface for user to designate cloud folders (e.g. Google Drive, Dropbox, Skydrive, iCloud, etc.), linking to WFF and running at back-end to monitor each cloud folder's usage. The WFF Manager may be minimized as a small icon in window's 'Toolbar' or 'Taskbar'.

Embodiment 1

Figure 2:
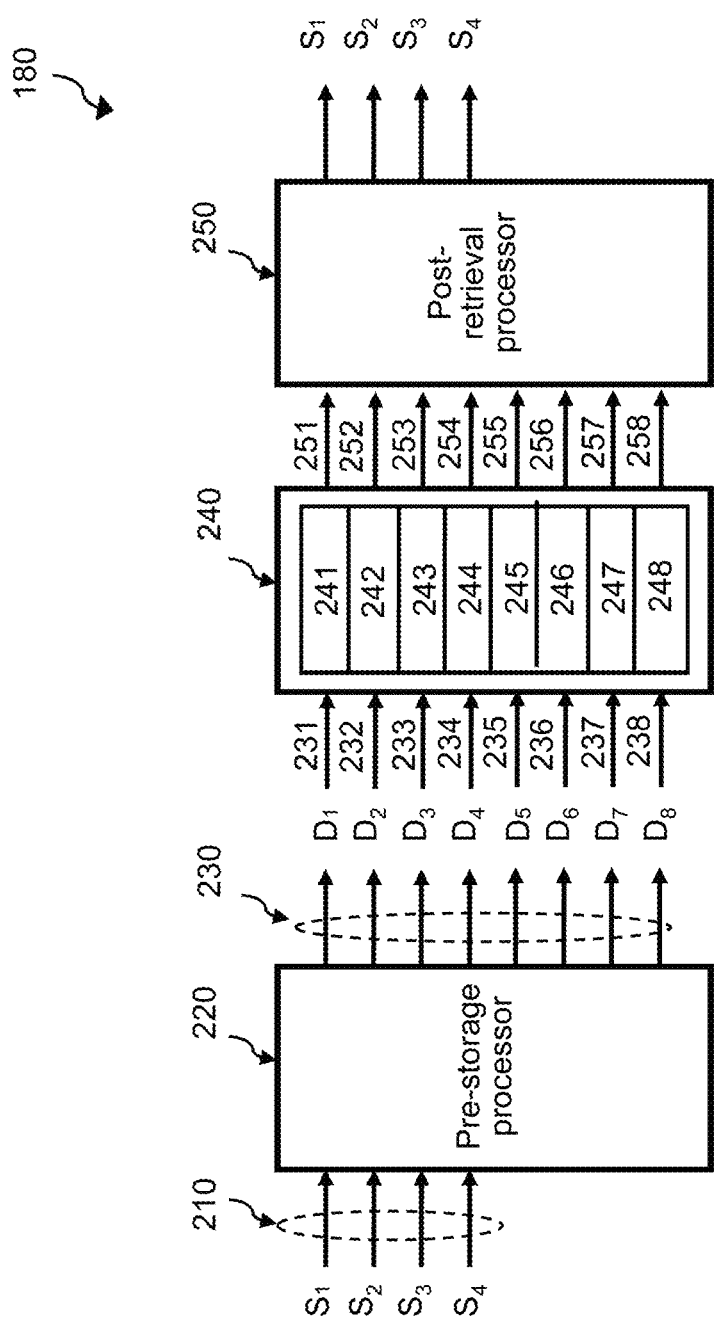
FIG. 2 is a diagram illustrating a data transport, storage, and retrieval processing system according to one embodiment.

FIG. 2 is a diagram illustrating a data transport, storage, and retrieval processing subsystem 180 shown in FIG. 1 according to one embodiment. The subsystem 180 includes a pre-storage processor 220, a storage area 240, and a post-retrieval processor 250.

FIG. 2 depicts an operation concept of using WF pre/post-transform techniques for storing 4 sets of data 210, $S_1$, $S_2$, $S_3$ and $S_4$, in the storage area 240 which includes 8 physically separated data storage sites 241, 242, 243, 244, 245, 246, 247, and 248 connected to the network 170 (shown in FIG. 1) or other user storage sites. The 4 sets of data 210 can represent 4 files of identical size, or 4 segments of identical size that are outcome of all possible manipulations on a single file or multiple files. It should be noted that the numbers of data sets and storages sites may be any suitable numbers. The use of 4 sets of data or 8 storage sites is merely for illustrative purposes.

The pre-storage processor 220 performs wavefront pre-transform, or wavefront multiplexing transform, that transforms the 4 data sets $S_1$, $S_2$, $S_3$ and $S_4$ to 230, the 8 wavefront components (WFCs) 230 $D_1$, $D_2$, $D_3$, $D_4$, $D_5$, $D_6$, $D_7$ and $D_8$. The pre-storage processor 220 may also perform WF pre-transform, or WF muxing, by taking 4 additional zero data sets as inputs as if these 4 zero data sets were grounded circuit input pins.

FIG. 2 also shows a retrieval process of the 4 sets of data. The 8 WFCs 230 are transported to 8 storage sites 241, 242, 243, 244, 245, 246, 247, and 248 individually through 8 different links 231, 232, 233, 234, 235, 236, 237, and 238. When demanded by the user, the 8 stored WFCs may be retrieved through 8 different links 251, 252, 253, 254, 255, 256, 257, and 258, and be transformed to the original data $S_1$, $S_2$, $S_3$ and $S_4$ by the post-storage processor 250 that performs WF post-transform or WF demuxing.

The 8 physically distributed storage sites 241, 242, 243, 244, 245, 246, 247, and 248 may represent 8 locations in user's registered cloud space, or 7 sites in user's registered cloud space and 1 user's storage device, or 6 sites in user's registered cloud space and 2 user's storage devices, or any combination of remote storage sites and user's storage devices. In general, these 8 sites may represent i locations in user's registered cloud space and 8-i user's storage devices, where i=0, . . . , 8.

The pre-storage processor 220 performs WF pre-transform, which features a mathematical description in matrix multiplication:

$$\begin{bmatrix} D_1 \\ D_2 \\ D_3 \\ D_4 \\ D_5 \\ D_6 \\ D_7 \\ D_8 \end{bmatrix} = W_{8\text{-}by\text{-}4} \begin{bmatrix} S_1 \\ S_2 \\ S_3 \\ S_4 \end{bmatrix} \quad (2)$$

The matrix $W_{8\text{-}by\text{-}4}$ represents an 8-by-4 matrix, as tabulated below, according to 4 column vectors of an 8-by-8 Hadamard matrix.

| 1 | 1  | 1  | 1  |
|---|----|----|----|
| 1 | -1 | 1  | -1 |
| 1 | 1  | -1 | -1 |
| 1 | -1 | -1 | 1  |
| 1 | 1  | 1  | 1  |
| 1 | -1 | 1  | -1 |
| 1 | 1  | -1 | -1 |
| 1 | -1 | -1 | 1  |

Equivalently, four auxiliary segments (constants) are introduced such that their values are known and the number of equations, M+N, remains the same. Let these auxiliary segments (constants) be $S_5=0$, $S_6=0$, $S_7=0$ and $S_8=0$. It is therefore sufficient to append the full 8-by-8 Hadamard matrix by N=4 additional rows for describing all involved (M+N+N=12) constraints via the following matrix multiplication:

$$\begin{bmatrix} D_1 \\ D_2 \\ D_3 \\ D_4 \\ D_5 \\ D_6 \\ D_7 \\ D_8 \\ 0 \\ 0 \\ 0 \\ 0 \end{bmatrix} = W_{12\text{-}by\text{-}8} \begin{bmatrix} S_1 \\ S_2 \\ S_3 \\ S_4 \\ S_5 \\ S_6 \\ S_7 \\ S_8 \end{bmatrix} \quad (3)$$

The matrix $W_{12\text{-}by\text{-}8}$ represents a 12-by-8 matrix, as tabulated below. It is constructed as an appended $W_{8\text{-}by\text{-}4}$ with 4 additional rows.

| | | | | | | | |
|---|---|---|---|---|---|---|---|
| 1 | 1 | 1 | 1 | 1 | 1 | 1 | 1 |
| 1 | −1 | 1 | −1 | 1 | −1 | 1 | −1 |
| 1 | 1 | −1 | −1 | 1 | 1 | −1 | −1 |
| 1 | −1 | −1 | 1 | 1 | −1 | −1 | 1 |
| 1 | 1 | 1 | 1 | −1 | −1 | −1 | −1 |
| 1 | −1 | 1 | −1 | −1 | 1 | −1 | 1 |
| 1 | 1 | −1 | −1 | −1 | −1 | 1 | 1 |
| 1 | −1 | −1 | 1 | −1 | 1 | 1 | −1 |
| 0 | 0 | 0 | 0 | 1 | 0 | 0 | 0 |
| 0 | 0 | 0 | 0 | 0 | 1 | 0 | 0 |
| 0 | 0 | 0 | 0 | 0 | 0 | 1 | 0 |
| 0 | 0 | 0 | 0 | 0 | 0 | 0 | 1 |

As shown in FIG. 2, the data sets 210 are to be stored in 8 storage sites 241, 242, 243, 244, 245, 246, 247, and 248 individually. The stored data sets are in the form of streams of numerical numbers as results of 8 different linear combinations of the same 4 data sets. Each of the 8 storage sites, 241, 242, 243, 244, 245, 246, 247, and 248, only stores one of the 8 assigned WFCs 230. Each of the WFCs is not comprehensible, and/or may appear with misleading information. For any WFC $D_i$, i=1, . . . , 8, i+230 represents a cloud-uploading link (wired, wireless or other applicable means) instantiated by the user for "writing" $D_i$, into site i+240 in the user's registered cloud space, or a device-importing link (serial or other applicable means) selected by the user for writing $D_i$ into site i+240 in the user's storage devices (disks, hard drives or other applicable means). For any WFC $D_i$, i=1, . . . , 8, i+250 represents a cloud-downloading link (wired, wireless or other applicable means) instantiated by the user for "reading" $D_i$ from site i+240 in the user's registered cloud space, or a device-exporting link (serial or other applicable means) selected by the user for reading $D_i$ from site i+240 in the user's storage devices.

The post-retrieval processor 250 performs WF post-transform according to 4 row vectors of an 8-by-8 Hadamard matrix, or equivalently via $W_{8\text{-}by\text{-}4}^T$, the transposition of $W_{8\text{-}by\text{-}4}$.

$$\begin{bmatrix} S_1 \\ S_2 \\ S_3 \\ S_4 \end{bmatrix} = \frac{1}{8} W_{8\text{-}by\text{-}4}^T \begin{bmatrix} D_1 \\ D_2 \\ D_3 \\ D_4 \\ D_5 \\ D_6 \\ D_7 \\ D_8 \end{bmatrix} \quad (4)$$

The matrix $W_{8\text{-}by\text{-}4}^T$ represents a 4-by-8 matrix, as tabulated below.

| | | | | | | | |
|---|---|---|---|---|---|---|---|
| 1 | 1 | 1 | 1 | 1 | 1 | 1 | 1 |
| 1 | −1 | 1 | −1 | 1 | −1 | 1 | −1 |
| 1 | 1 | −1 | −1 | 1 | 1 | −1 | −1 |
| 1 | −1 | −1 | 1 | 1 | −1 | −1 | 1 |

Four auxiliary constraints need to be retained in accordance to the four auxiliary segments (constants) $S_5=0$, $S_6=0$, $S_7=0$ and $S_8=0$.

$$\begin{bmatrix} 0 \\ 0 \\ 0 \\ 0 \end{bmatrix} = \begin{bmatrix} S_5 \\ S_6 \\ S_7 \\ S_8 \end{bmatrix} = \frac{1}{8} W_{4\text{-}by\text{-}8} \begin{bmatrix} D_1 \\ D_2 \\ D_3 \\ D_4 \\ D_5 \\ D_6 \\ D_7 \\ D_8 \end{bmatrix} \quad (5)$$

The matrix $W_{4\text{-}by\text{-}8}$ represents a 4-by-8 matrix, as tabulated below.

| | | | | | | | |
|---|---|---|---|---|---|---|---|
| 1 | 1 | 1 | 1 | −1 | −1 | −1 | −1 |
| 1 | −1 | 1 | −1 | −1 | 1 | −1 | 1 |
| 1 | 1 | −1 | −1 | −1 | −1 | 1 | 1 |
| 1 | −1 | −1 | 1 | −1 | 1 | 1 | −1 |

It can be seen that if any $D_i$ was modified unexpectedly, the above constraints would fail to hold, which would reveal that the integrity in the stored WFCs was compromised.

In fact, the WFCs also feature repetition such that $D_1=D_5$, $D_2=D_6$, $D_3=D_7$ and $D_4=D_8$. To remove this feature, the four auxiliary segments (constants), $S_5=0$, $S_6=0$, $S_7=0$ and $S_8=0$, can be modified such that they become non-zero constants. With this premise, the architecture in FIG. 2 features "degree of shared-redundancy" N+M=8. Given that each of the 8 sites, 241, 242, 243, 244, 245, 246, 247, and 248, has equal survivability of 90% over the next month, the overall survivability, one can deduce that the probability of at least 4 sites being available, is $$\sum_{k=4}^{8} \binom{8}{k} 0.9^k (1-0.9)^{8-k} = 0.9996 \quad (6)$$

Without the shared-redundancy, the required survivability, the probability of exactly 4 sites being available, would be $0.9^4=0.6561$.

One can compare the WF pre/post-transform technologies with RAID based on the architecture in FIG. 2. For a RAID technology that performs mirroring such that $S_1$ is stored in 241 and 242, $S_2$ in 243 and 244, $S_3$ in 245 and 246, and $S_4$ in 247 and 248, RAID fails to provide data survivability if the sites 241, 242, 243, and 244 are not available. RAID also fails if the sites 245, 246, 247, and 248 are not available. For a RAID technology that forms 4 parity sets and transports the 4 data sets to 4 sites 241, 242, 243, and 244, and the 4 parity sets to 4 sites 245, 246, 247, and 248, it fails to protect the stored data set if unauthorized party eavesdrops on any site of 241, 242, 243, and 244. In contrast, each of the WFCs is not comprehensible, and/or may appear with misleading information to an unauthorized party.

Figure 3:
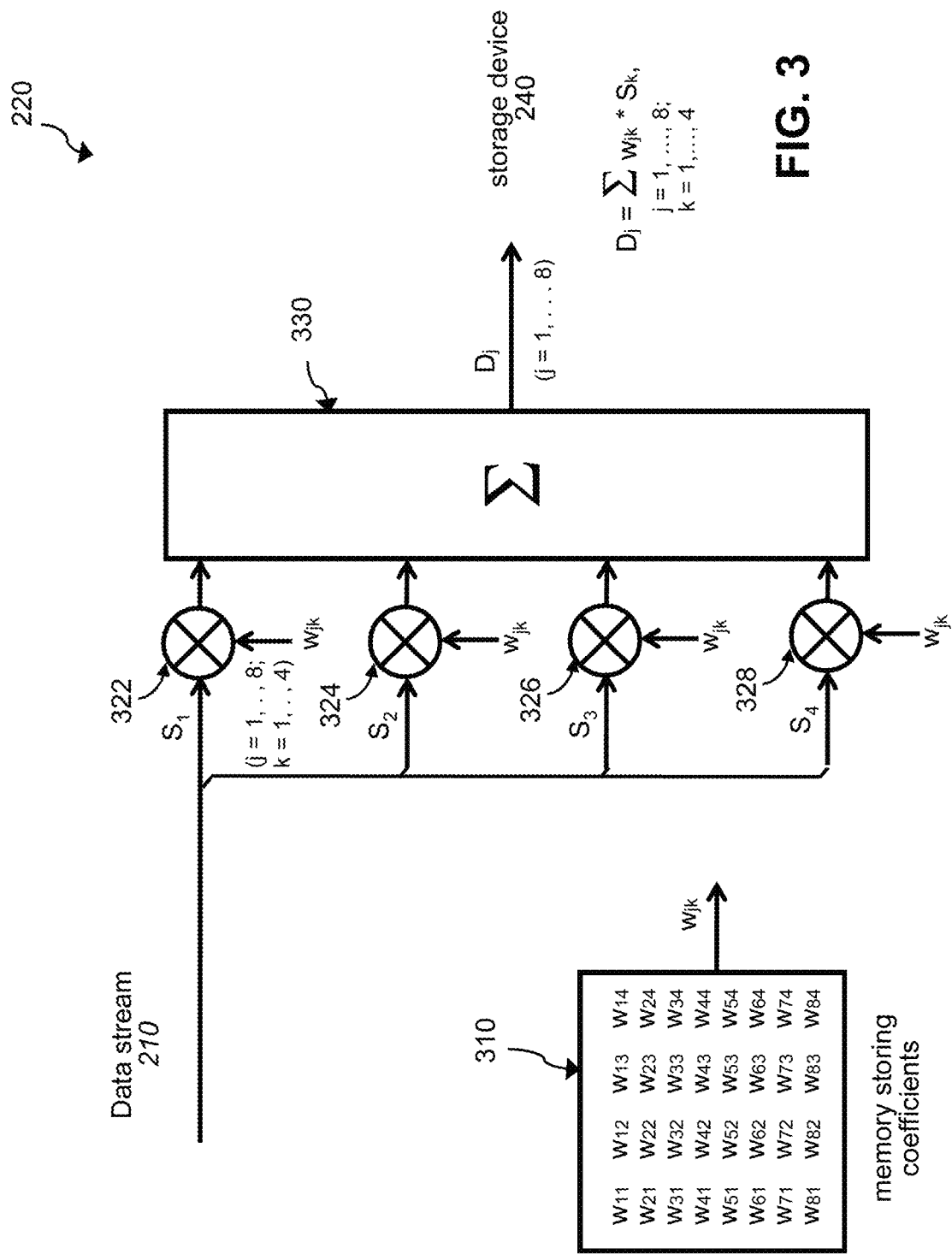
FIG. 3 is a diagram illustrating an architecture for the wavefront transform for arbitrary matrix coefficients according to one embodiment.

FIG. 3 is a diagram illustrating an architecture for the wavefront transform for arbitrary matrix coefficients according to one embodiment.

The architecture corresponds to the 4x4 matrix shown in Equation (1) above. The pre-storage processor 220 includes a storage device 310 such as a memory that stores the coefficients $w_{jk}$'s (j=1, ..., 8; k=1, ..., 4), multipliers 322, 324, 326, and 328 and an adder 330. For fully parallel operations, four sets of the 4 multipliers and one adder will be needed. Any combination of devices may be employed. For example, a single multiplier and a 2-input adder may be used where the multiplier performs multiplication sequentially and the adder acts like an accumulator to accumulate the partial products. The input $S_4$ may be unused. The four multipliers 322, 324, 326, and 328 and the adder 330 may form a linear combiner that perform a linear combination of the coefficients $w_{jk}$'s and the input streams $S_k$'s as discussed above.

It should also be noted that while the architecture 220 is shown for the WF pre-transform processor, it is also applicable for the WF post-transform processor 250 because both types of processor involve a matrix multiplication. The differences are the types of inputs and outputs and the matrix coefficients in the memory 310. Furthermore, the architecture 220 may be performed by a series of instructions when the system is implemented by a processor executing a program. It is well known to one skilled in the arts to understand how to implement such a process using a program.

Figure 4:
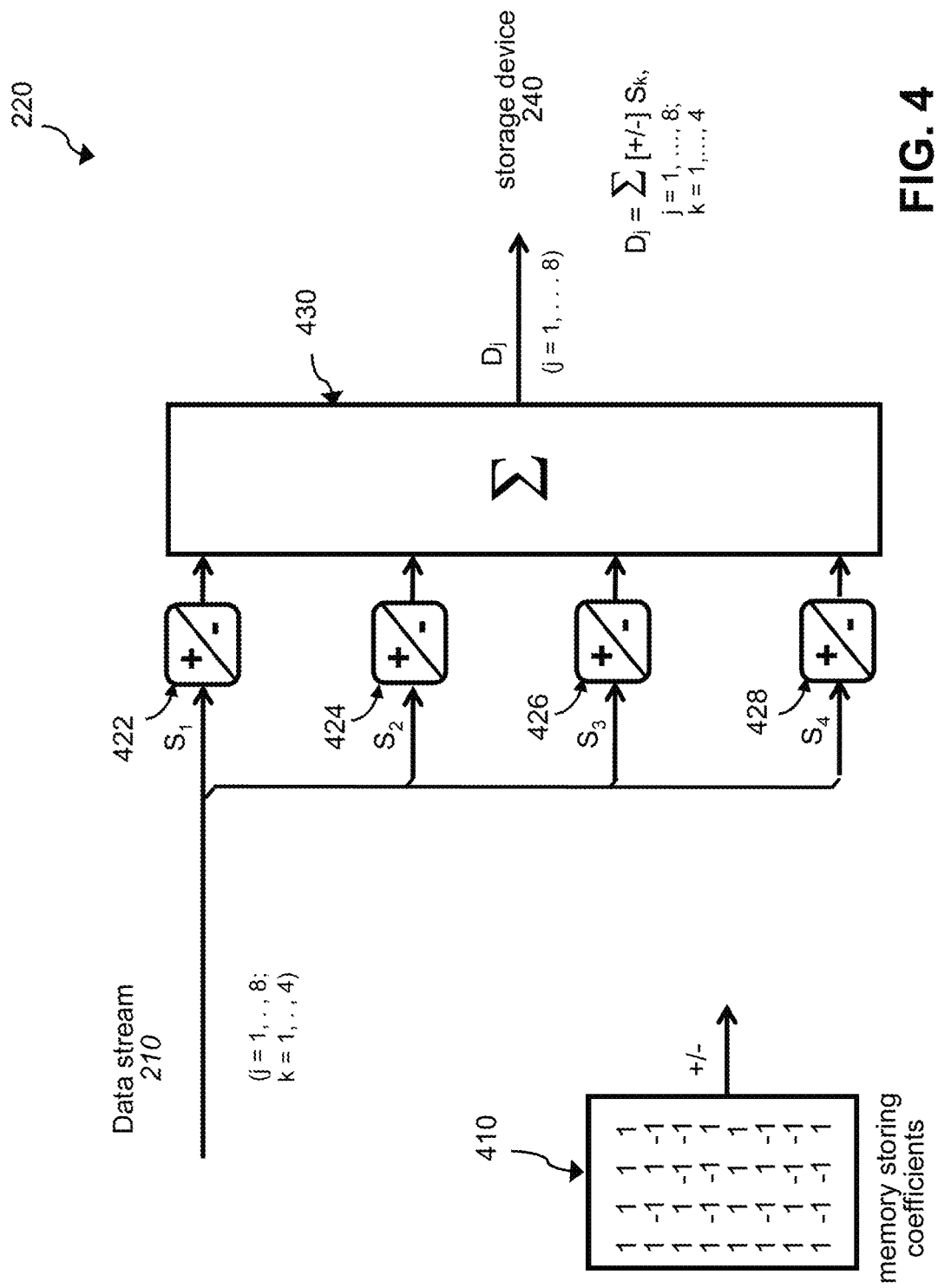
FIG. 4 is a diagram illustrating an architecture for the wavefront transform for unity matrix coefficients according to one embodiment.

FIG. 4 is a diagram illustrating an architecture for the wavefront transform 220 for unity matrix coefficients according to one embodiment. The architecture in FIG. 4 is a special case of the architecture in FIG. 3 where the coefficients wjk's are unities (1s) with +and - signs. Since the coefficients involve only unities, no multiplications are needed and only a sign change is required. Accordingly, the multipliers 322, 324, 326, and 328 are replaced by the sign operators 422, 424, 426, and 428, respectively. The adder 330 becomes the adder 430 which may perform addition or subtraction depending on whether the sign is +or −, respectively.

Furthermore, as in FIG. 3, the processor 220 with unity coefficients may be used for the WF post-transform processor 250 and may be implemented by a processor executing a program.

Embodiment 2

Figure 5:
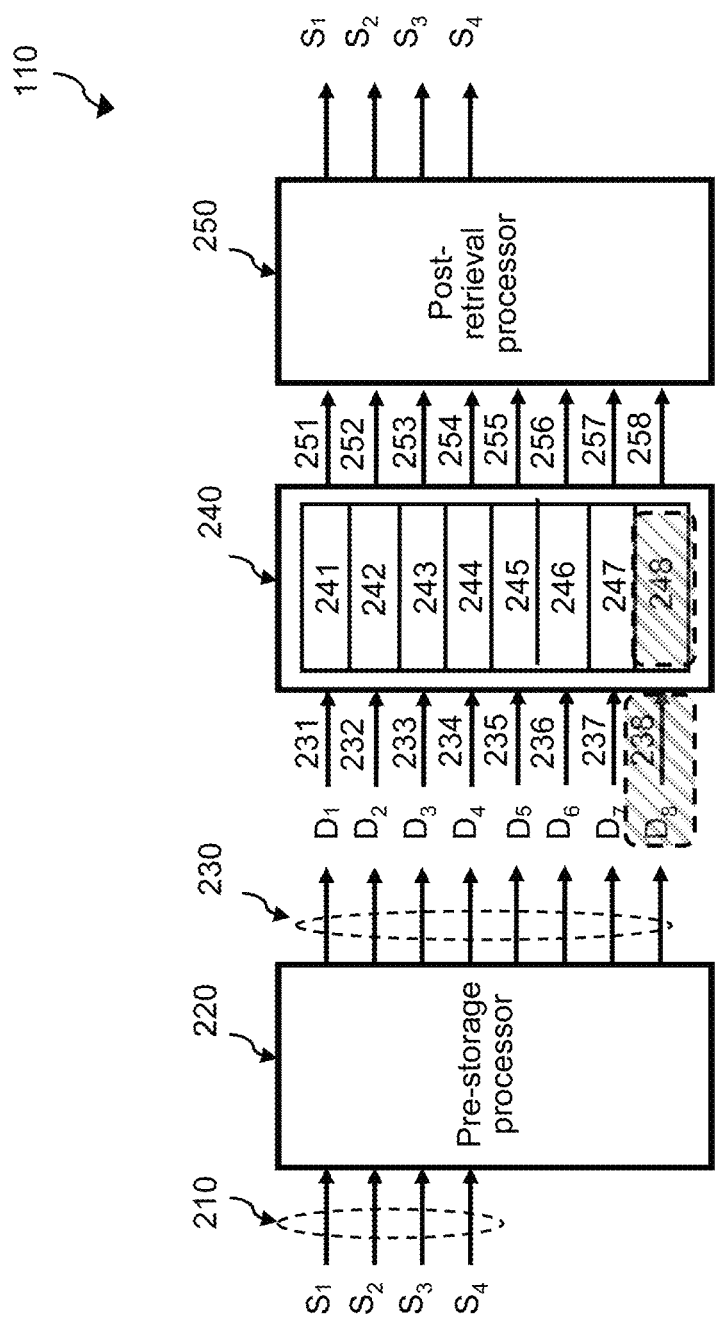
FIG. 5 is a diagram illustrating a data transport, storage, and retrieval processing system with one missing wavefront component according to one embodiment.

FIG. 5 is a diagram illustrating a data transport, storage, and retrieval processing system with one missing wavefront component according to one embodiment. Similar to FIG. 2, FIG. 5 depicts an operation concept of using WF pre/post-transform techniques for storing 4 sets of data 210, $S_1$, $S_2$, $S_3$ and $S_4$, in 8 intended data storage sites 241, 242, 243, 244, 245, 246, 247, and 248. $D_8$ is however not available and cannot be retrieved by the post-retrieval processor 250. The unavailability of $D_8$ may be due to various circumstances along the path of 238-248-258: (1) link 238 is established or damaged, site 248 is functioning or damaged, but link 258 is damaged; (2) link 238 is established, link 258 is established or damaged, but site 248 is damaged; and (3) site 248 is functioning or damaged, link 258 is established or damaged, but link 138 is damaged.

The remaining 7 WFCs, $D_1$, $D_2$, $D_3$, $D_4$, $D_5$, $D_6$, and $D_7$, can be transported individually via 7 links 151, 152, 153, 154, 155, 156, and 157, to the post-retrieval processor 250, which reconstitutes the 4 sets of data $S_1$, $S_2$, $S_3$ and $S_4$ by treating $D_8$ as an auxiliary unknown variable to be solved in the following equation:

$$\begin{bmatrix} D_1 \\ D_2 \\ D_3 \\ D_4 \\ D_5 \\ D_6 \\ D_7 \\ 0 \\ 0 \\ 0 \\ 0 \\ 0 \end{bmatrix} = W_{12\text{-}by\text{-}9} \begin{bmatrix} S_1 \\ S_2 \\ S_3 \\ S_4 \\ S_5 \\ S_6 \\ S_7 \\ S_8 \\ D_8 \end{bmatrix}. \tag{7}$$

The matrix $W_{12\text{-}by\text{-}9}$ represents a 12-by-9 matrix, as tabulated below.

| | | | | | | | | |
|---|---|---|---|---|---|---|---|---|
| 1 | 1 | 1 | 1 | 1 | 1 | 1 | 1 | 0 |
| 1 | −1 | 1 | −1 | 1 | −1 | 1 | −1 | 0 |
| 1 | 1 | −1 | −1 | 1 | 1 | −1 | −1 | 0 |
| 1 | −1 | −1 | 1 | 1 | −1 | −1 | 1 | 0 |
| 1 | 1 | 1 | 1 | −1 | −1 | −1 | −1 | 0 |
| 1 | −1 | 1 | −1 | −1 | 1 | −1 | 1 | 0 |
| 1 | 1 | −1 | −1 | −1 | −1 | 1 | 1 | 0 |
| 1 | −1 | −1 | 1 | −1 | 1 | 1 | −1 | −1 |
| 0 | 0 | 0 | 0 | 1 | 0 | 0 | 0 | 0 |
| 0 | 0 | 0 | 0 | 0 | 1 | 0 | 0 | 0 |
| 0 | 0 | 0 | 0 | 0 | 0 | 1 | 0 | 0 |
| 0 | 0 | 0 | 0 | 0 | 0 | 0 | 1 | 0 |

FIG. 5 represents one of the $\binom{8}{1}=8$ cases in which one WFC $D_i$, i=1, ..., 8, is not available. When exactly one WFC is missing, the post-retrieval processor 250 may reconstitute the 4 sets of data $S_1$, $S_2$, $S_3$ and $S_4$ by the remaining 7 WFCs, each of which is attached to established links j+130 and j+150, j≠i. The post-retrieval processor 250 reconstitutes the 4 sets of data $S_1$, $S_2$, $S_3$ and $S_4$ by treating $D_i$ as an auxiliary unknown variable to be solved.

Embodiment 3

Figure 6:
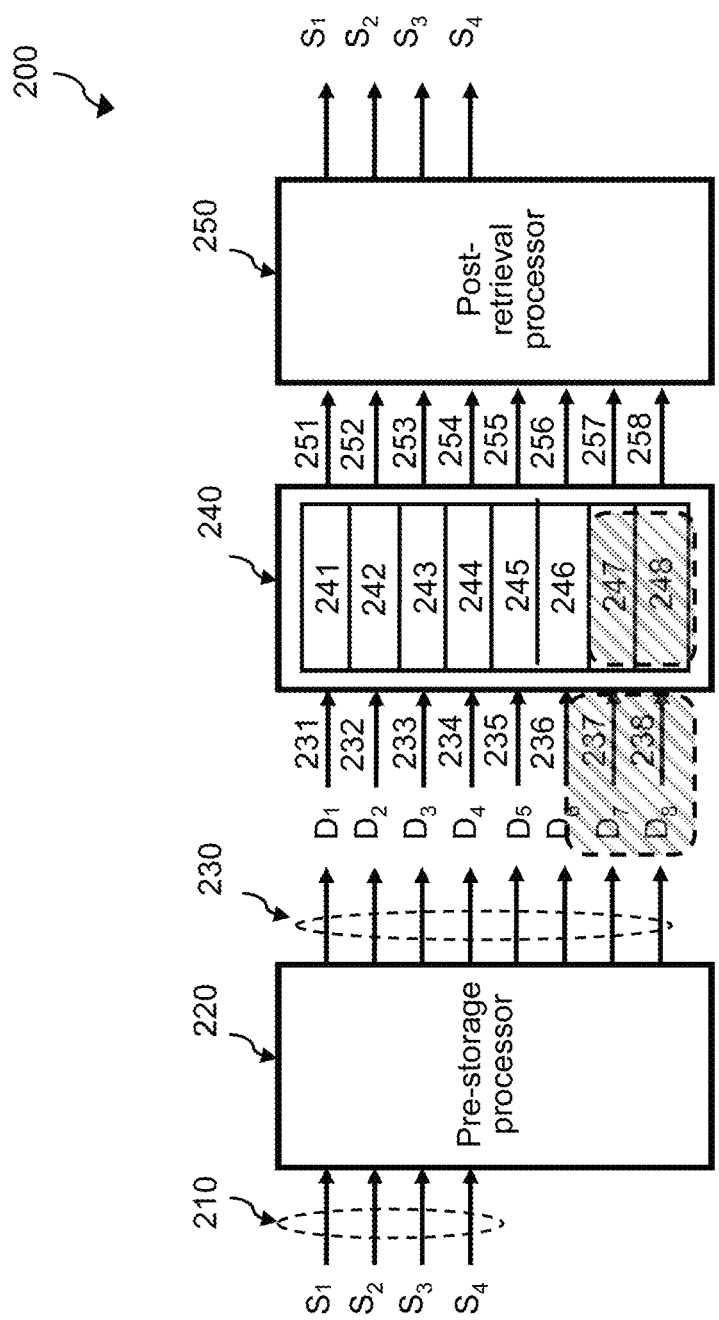
FIG. 6 is a diagram illustrating a data transport, storage, and retrieval processing system with two missing wavefront components according to one embodiment.

FIG. 6 is a diagram illustrating a data transport, storage, and retrieval processing system 200 with two missing wavefront components according to one embodiment. Similar to FIG. 2, FIG. 6 depicts an operation concept of using WF pre/post-transform techniques for storing 4 sets of data 100, $S_1$, $S_2$, $S_3$ and $S_4$, in 8 intended data storage sites 241, 242, 243, 244, 245, 246, 247, and 248. $D_7$ and $D_8$ are however not available and cannot be retrieved by the post-retrieval processor 250.

The unavailability of $D_7$ may be due to various circumstances along the path of 237-247-257: (1) link 237 is established or damaged, site 247 is functioning or damaged, but link 257 is damaged; (2) link 237 is established, link 257 is established or damaged, but site 247 is damaged; and (3) site 247 is functioning or damaged, link 257 is established or damaged, but link 237 is damaged.

The unavailability of $D_8$ may be due to various circumstances as stated in Embodiment 2.

The remaining 6 WFCs, $D_1$, $D_2$, $D_3$, $D_4$, $D_5$, and $D_6$, can be transported individually via 6 links 251, 252, 253, 254, 255, and 256, to the post-retrieval processor 250, which reconstitutes the 4 sets of data $S_1$, $S_2$, $S_3$ and $S_4$ by treating $D_7$ and $D_8$ as auxiliary unknown variables to be solved in the following equation:

$$\begin{bmatrix} D_1 \\ D_2 \\ D_3 \\ D_4 \\ D_5 \\ D_6 \\ 0 \\ 0 \\ 0 \\ 0 \\ 0 \\ 0 \end{bmatrix} = W_{12\text{-}by\text{-}10} \begin{bmatrix} S_1 \\ S_2 \\ S_3 \\ S_4 \\ S_5 \\ S_6 \\ S_7 \\ S_8 \\ D_7 \\ D_8 \end{bmatrix}. \quad (8)$$

The matrix $W_{12\text{-}by\text{-}10}$ represents a 12-by-10 matrix, as tabulated below.

| 1 | 1 | 1 | 1 | 1 | 1 | 1 | 1 | 0 | 0 |
|---|---|---|---|---|---|---|---|---|---|
| 1 | -1 | 1 | -1 | 1 | -1 | 1 | -1 | 0 | 0 |
| 1 | 1 | -1 | -1 | 1 | 1 | -1 | -1 | 0 | 0 |
| 1 | -1 | -1 | 1 | 1 | -1 | -1 | 1 | 0 | 0 |
| 1 | 1 | 1 | 1 | -1 | -1 | -1 | -1 | 0 | 0 |
| 1 | -1 | 1 | -1 | -1 | 1 | -1 | 1 | 0 | 0 |
| 1 | 1 | -1 | -1 | -1 | -1 | 1 | 1 | -1 | 0 |
| 1 | -1 | -1 | 1 | -1 | 1 | 1 | -1 | 0 | -1 |
| 0 | 0 | 0 | 0 | 1 | 0 | 0 | 0 | 0 | 0 |
| 0 | 0 | 0 | 0 | 0 | 1 | 0 | 0 | 0 | 0 |
| 0 | 0 | 0 | 0 | 0 | 0 | 1 | 0 | 0 | 0 |
| 0 | 0 | 0 | 0 | 0 | 0 | 0 | 1 | 0 | 0 |

FIG. 6 represents one of the $\binom{8}{2}=28$ cases in which two WFCs $D_i$ and $D_j$, i, j ∈ {i≠j, i, j=1, . . . ,8}, are not available. When exactly two WFCs are missing, the post-retrieval processor 250 may reconstitute the 4 sets of data $S_1$, $S_2$, $S_3$ and $S_4$ by the remaining 6 WFCs, each of which is attached to established links k+230 and k+250, k≠i, k≠j. The post-retrieval processor 250 reconstitutes the 4 sets of data $S_1$, $S_2$, $S_3$ and $S_4$ by treating $D_i$ and $D_j$ as auxiliary unknown variables to be solved.

Embodiment 4

Figure 7:
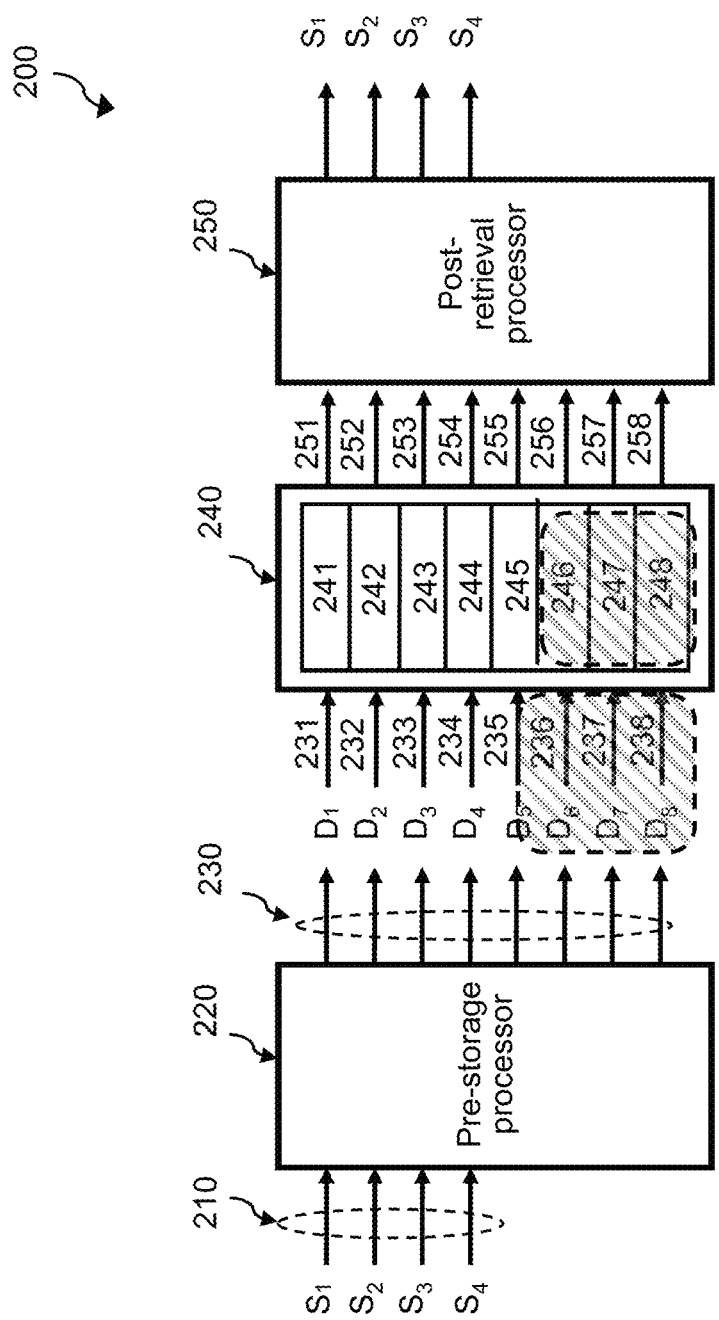
FIG. 7 is a diagram illustrating a data transport, storage, and retrieval processing system with three missing wavefront components according to one embodiment.

FIG. 7 is a diagram illustrating a data transport, storage, and retrieval processing system 200 with three missing wavefront components according to one embodiment. Similar to FIG. 2, FIG. 7 depicts an operation concept of using WF pre/post-transform techniques for storing 4 sets of data 100, $S_1$, $S_2$, $S_3$ and $S_4$, in 8 intended data storage sites 241, 242, 243, 244, 245, 246, 247, and 248. $D_6$, $D_7$ and $D_8$ are however not available and cannot be retrieved by the post-retrieval processor 250.

The unavailability of $D_6$ may be due to various circumstances along the path of 236-246-256: (1) link 236 is established or damaged, site 246 is functioning or damaged, but link 256 is damaged; (2) link 236 is established, link 256 is established or damaged, but site 246 is damaged; and (3) site 246 is functioning or damaged, link 256 is established or damaged, but link 236 is damaged.

The unavailability of $D_7$ and $D_8$ may be due to various circumstances as stated in Embodiment 2 and Embodiment 3.

The remaining 5 WFCs, $D_1$, $D_2$, D3, $D_4$, and $D_5$, can be transported individually via 5 links 151, 152, 153, 154, and 155, to the post-retrieval processor 250, which reconstitutes the 4 sets of data $S_1$, $S_2$, $S_3$ and $S_4$ by treating $D_6$, $D_7$ and $D_8$ as auxiliary unknown variables to be solved in the following equation:

$$\begin{bmatrix} D_1 \\ D_2 \\ D_3 \\ D_4 \\ D_5 \\ 0 \\ 0 \\ 0 \\ 0 \\ 0 \\ 0 \\ 0 \end{bmatrix} = W_{12\text{-}by\text{-}11} \begin{bmatrix} S_1 \\ S_2 \\ S_3 \\ S_4 \\ S_5 \\ S_6 \\ S_7 \\ S_8 \\ D_6 \\ D_7 \\ D_8 \end{bmatrix}. \quad (9)$$

The matrix $W_{12\text{-}by\text{-}11}$ represents a 12-by-11 matrix, as tabulated below.

| 1 | 1 | 1 | 1 | 1 | 1 | 1 | 1 | 0 | 0 | 0 |
|---|---|---|---|---|---|---|---|---|---|---|
| 1 | -1 | 1 | -1 | 1 | -1 | 1 | -1 | 0 | 0 | 0 |
| 1 | 1 | -1 | -1 | 1 | 1 | -1 | -1 | 0 | 0 | 0 |
| 1 | -1 | -1 | 1 | 1 | -1 | -1 | 1 | 0 | 0 | 0 |
| 1 | 1 | 1 | 1 | -1 | -1 | -1 | -1 | 0 | 0 | 0 |
| 1 | -1 | 1 | -1 | -1 | 1 | -1 | 1 | -1 | 0 | 0 |
| 1 | 1 | -1 | -1 | -1 | -1 | 1 | 1 | 0 | -1 | 0 |
| 1 | -1 | -1 | 1 | -1 | 1 | 1 | -1 | 0 | 0 | -1 |
| 0 | 0 | 0 | 0 | 1 | 0 | 0 | 0 | 0 | 0 | 0 |
| 0 | 0 | 0 | 0 | 0 | 1 | 0 | 0 | 0 | 0 | 0 |
| 0 | 0 | 0 | 0 | 0 | 0 | 1 | 0 | 0 | 0 | 0 |
| 0 | 0 | 0 | 0 | 0 | 0 | 0 | 1 | 0 | 0 | 0 |

FIG. 7 represents one of the $\binom{8}{3}=56$ cases in which three WFCs $D_i$, $D_j$ and $D_p$, i, j, p ∈ {i≠j, i≠p, p≠j,i,j,p=1, . . . ,8}, are not available. When exactly three WFCs are missing, the post-retrieval processor 250 may reconstitute the 4 sets of data $S_1$, $S_2$, $S_3$ and $S_4$ by the remaining 5 WFCs, each of which is attached to established links k+230 and k+250, k≠i, k≠j, k≠p. The post-retrieval processor 250 reconstitutes the 4 sets of data $S_1$, $S_2$, $S_3$ and $S_4$ by treating $D_i$, $D_j$ and $D_p$ as auxiliary unknown variables to be solved.

Embodiment 5

Figure 8:
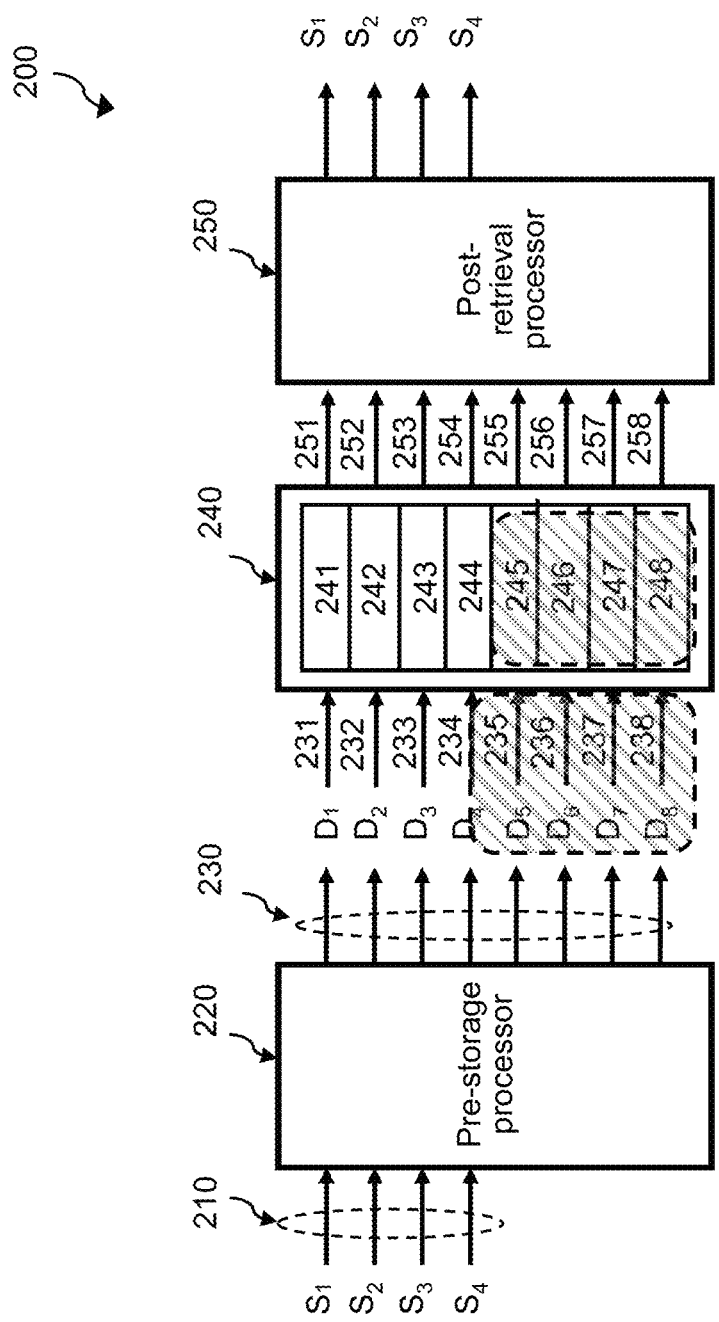
FIG. 8 is a diagram illustrating a data transport, storage, and retrieval processing system with four missing wavefront components according to one embodiment.

FIG. 8 is a diagram illustrating a data transport, storage, and retrieval processing system 200 with four missing wavefront components according to one embodiment. Similar to FIG. 2, FIG. 8 depicts an operation concept of using WF pre/post-transform techniques for storing 4 sets of data 210, $S_1$, $S_2$, $S_3$ and $S_4$, in 8 intended data storage sites 241, 242, 243, 244, 245, 246, 247, and 248. $D_5$, $D_6$, $D_7$ and $D_8$ are however not available and cannot be retrieved by the post-retrieval processor 250.

The unavailability of $D_5$ may be due to various circumstances along the path of 235-245-255: (1) link 235 is established or damaged, site 245 is functioning or damaged, but link 255 is damaged; (2) link 235 is established, link 255 is established or damaged, but site 245 is damaged; and (3) site 245 is functioning or damaged, link 255 is established or damaged, but link 235 is damaged.

The unavailability of $D_6$, $D_7$ and $D_8$ may be due to various circumstances as stated in Embodiment 2, Embodiment 3 and Embodiment 4.

The remaining 4 WFCs, $D_1$, $D_2$, $D_3$, and $D_4$, can be transported individually via 4 links 251, 252, 253, and 254, to the post-retrieval processor 250, which reconstitutes the 4 sets of data $S_1$, $S_2$, $S_3$ and $S_4$ by treating $D_5$, $D_6$, $D_7$ and $D_8$ as auxiliary unknown variables to be solved in the following equation:

$$\begin{bmatrix} D_1 \\ D_2 \\ D_3 \\ D_4 \\ 0 \\ 0 \\ 0 \\ 0 \\ 0 \\ 0 \\ 0 \\ 0 \end{bmatrix} = W_{12\text{-}by\text{-}12} \begin{bmatrix} S_1 \\ S_2 \\ S_3 \\ S_4 \\ S_5 \\ S_6 \\ S_7 \\ S_8 \\ D_5 \\ D_6 \\ D_7 \\ D_8 \end{bmatrix}. \quad (10)$$

The matrix $W_{12\text{-}by\text{-}12}$ represents a 12-by-12 matrix, as tabulated below.

| 1 | 1 | 1 | 1 | 1 | 1 | 1 | 1 | 0 | 0 | 0 | 0 |
|---|---|---|---|---|---|---|---|---|---|---|---|
| 1 | -1 | 1 | -1 | 1 | -1 | 1 | -1 | 0 | 0 | 0 | 0 |
| 1 | 1 | -1 | -1 | 1 | 1 | -1 | -1 | 0 | 0 | 0 | 0 |
| 1 | -1 | -1 | 1 | 1 | -1 | -1 | 1 | 0 | 0 | 0 | 0 |
| 1 | 1 | 1 | 1 | -1 | -1 | -1 | -1 | -1 | 0 | 0 | 0 |
| 1 | -1 | 1 | -1 | -1 | 1 | -1 | 1 | 0 | -1 | 0 | 0 |
| 1 | 1 | -1 | -1 | -1 | -1 | 1 | 1 | 0 | 0 | -1 | 0 |
| 1 | -1 | -1 | 1 | -1 | 1 | 1 | -1 | 0 | 0 | 0 | -1 |
| 0 | 0 | 0 | 0 | 1 | 0 | 0 | 0 | 0 | 0 | 0 | 0 |
| 0 | 0 | 0 | 0 | 0 | 1 | 0 | 0 | 0 | 0 | 0 | 0 |
| 0 | 0 | 0 | 0 | 0 | 0 | 1 | 0 | 0 | 0 | 0 | 0 |
| 0 | 0 | 0 | 0 | 0 | 0 | 0 | 1 | 0 | 0 | 0 | 0 |

FIG. 8 represents one of the $\binom{8}{4}=70$ cases in which four WFCs $D_i$, $D_j$, $D_p$, and $D_q$, i,j,p,q ∈ {i≠j, i≠p, i≠q, j≠p, j≠q, p≠q, i,j,p,q=1, . . . ,8} are not available. When exactly four WFCs are missing, the post-retrieval processor 250 may reconstitute the 4 sets of data $S_1$, $S_2$, $S_3$ and $S_4$ by the remaining 4 WFCs, each of which is attached to established links k+230 and k+250, k≠i, k≠j, k≠p, k≠q. The post-retrieval processor 250 reconstitutes the 4 sets of data $S_1$, $S_2$, $S_3$ and $S_4$ by treating $D_i$, $D_j$, $D_p$ and $D_q$ as auxiliary unknown variables to be solved.

Embodiment 6

Figure 9:
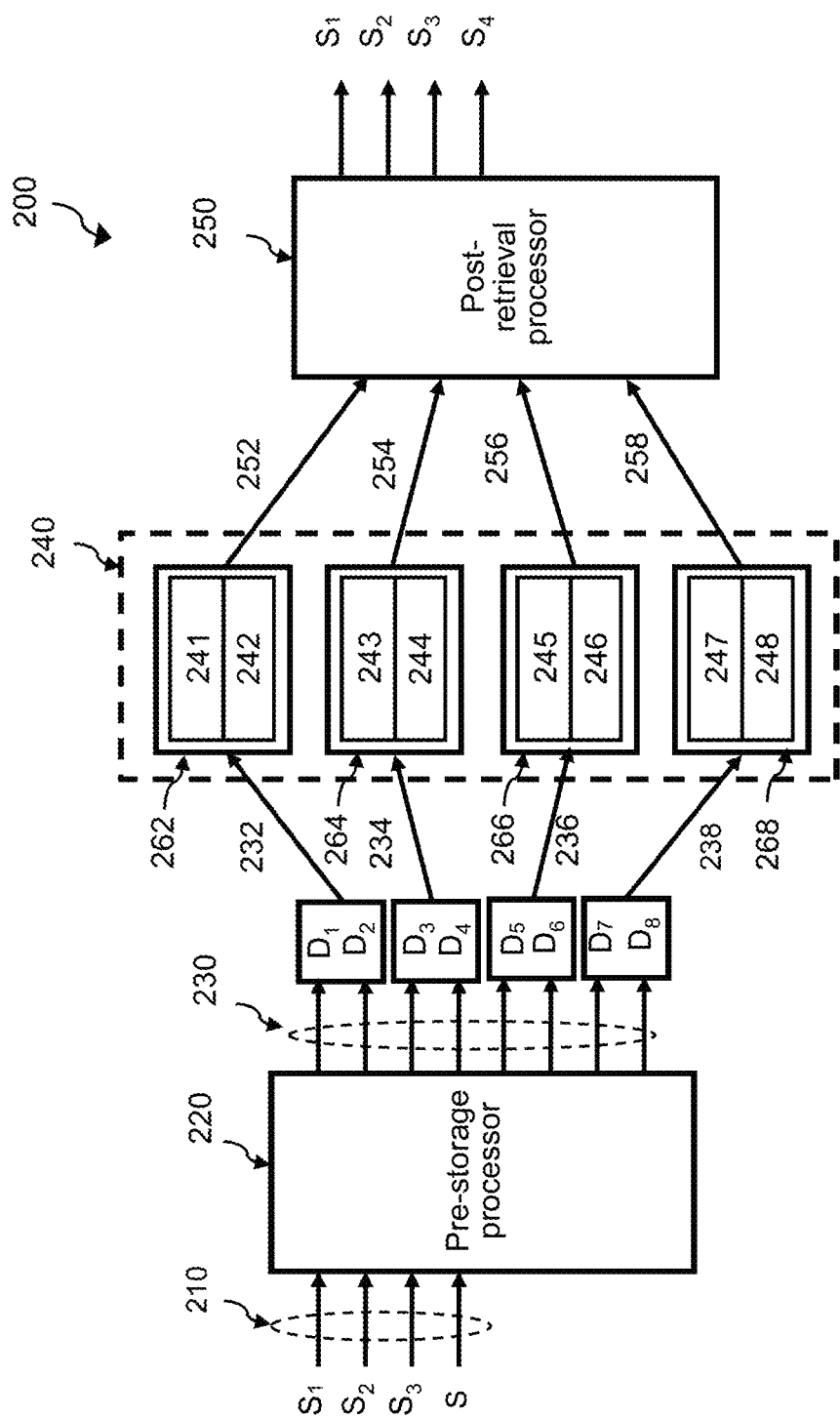
FIG. 9 is a diagram illustrating a data transport, storage, and retrieval processing system with wavefront components sharing links according to one embodiment.

FIG. 9 is a diagram illustrating a data transport, storage, and retrieval processing system 200 with wavefront components sharing links according to one embodiment. FIG. 9 depicts an operation concept of using WF pre/post-transform techniques for storing 4 sets of data 210, $S_1$, $S_2$, $S_3$ and $S_4$, in 8 physically separated data storage sites 241, 242, 243, 244, 245, 246, 247, and 248. The 4 sets of data 210 can represent 4 files of identical size, or 4 segments of identical size that are outcome of all possible manipulations on a single file or multiple files. As stated in Embodiment 1, a pre-storage processor 220 performs WF pre-transformation that transforms the 4 data sets $S_1$, $S_2$, $S_3$ and $S_4$ to 230, the 8 WFCs $D_1$, $D_2$, $D_3$, $D_4$, $D_5$, $D_6$, $D_7$ and $D_8$. The pre-storage processor 220 can also perform WF pre-transformation by taking 4 additional zero data sets as inputs as if these 4 zero data sets were grounded circuit input pins.

FIG. 9 also shows a retrieval process of the 4 sets of data. The 8 WFCs, 230, are transported to 8 storage sites 241, 242, 243, 244, 245, 246, 247, and 248, individually through 4 different links 232, 234, 236, and 238. When demanded by the user, the 8 stored WFCs can be retrieved through 4 different links 252, 254, 256, and 258, and be transformed to the original data $S_1$, $S_2$, $S_3$ and $S_4$ by the post-retrieval processor 250 that performs WF post-transformation as similarly described in Embodiment 1.

Different from Embodiment 1, the WFCs $D_1$ and $D_2$ share the link 232 to enter the aggregated site 262 having the storage sites (241, 242), the WFCs $D_3$ and $D_4$ share the link 234 to enter the aggregated site 264 having the storage sites (243, 244), the WFCs $D_5$ and $D_6$ share the link 236 to enter the aggregated site 266 having the storage sites (245, 246), and the WFCs $D_7$ and $D_8$ share the link 238 to enter the aggregated site 268 having the storage sites (247, 248).

Different from Embodiment 1, the WFCs $D_1$ and $D_2$ share the link 252 to be transported from the aggregated site 262, the WFCs $D_3$ and $D_4$ share the link 254 to be transported from the aggregated site 264, the WFCs $D_5$ and $D_6$ share the link 256 to be transported from the aggregated site 266, and the WFCs $D_7$ and $D_8$ share the link 258 to be transported from the aggregated site 268.

The 4 physically distributed aggregated storage sites 262, 264, 266, and 268 can represent 4 cloud storage accounts registered by the user, or 3 cloud storage accounts registered by the user and 1 user's storage device, or 2 cloud storage accounts registered by the user and 2 user's storage devices, or any combination of registered cloud accounts and user's storage devices. In general, these 4 aggregated sites can represent i cloud storage accounts registered by the user and 4-i user's storage devices, where i=0, . . . , 4. Within each cloud storage account as an aggregated storage site, the boundary between different sites is defined by the notion of virtualization. Within each storage device of the user as an aggregated storage site, the boundary between different sites is defined by user's partition or other applicable means.

Similar to Embodiment 1, the data sets 210 are to be stored in 8 storage sites 241, 242, 243, 244, 245, 246, 247, and 248, individually. The stored data sets are in the form of streams of numerical numbers as results of 8 different linear combinations of the same 4 data sets. Each of the 8 storage sites, 241, 242, 243, 244, 245, 246, 247, and 248, only stores one of the 8 assigned WFCs (230). Each of the WFCs is not comprehensible, and/or may appear with misleading information.

For any aggregated site 2i+260, i=1, . . . , 4, 2i+230 represents a cloud-uploading link (wired, wireless or other applicable means) instantiated by the user for "writing" $D_{2i-1}$ and $D_{2i}$ into sites i+240 and i+241 in the user's registered cloud space, or a device-importing link (serial or other applicable means) selected by the user for writing $D_{2i-1}$ and $D_{2i}$ into sites i+240 and i+241 in the user's storage devices (disks, hard drives or other applicable means). For any aggregated site 2i+260, i=1, . . . , 4, 2i+250 represents a cloud-downloading link (wired, wireless or other applicable means) instantiated by the user for "reading" $D_{2i-1}$ and $D_{2i}$ from sites i+240 and i+241, respectively, in the user's registered cloud space, or a device-exporting link (serial or other applicable means) selected by the user for reading $D_{2i-1}$ and $D_{2i}$ from sites i+240 and i+241, respectively, in the user's storage devices.

Considering the likely failure on the level of aggregated sites in FIG. 9, one can evaluate the data survivability based on "effective degree of shared-redundancy", which is 4 in this case. Given that each of the 4 aggregated sites, 262, 264, 266, and 268, has equal survivability of 90% over the next month, and that two WFCs are unavailable upon the failure of their residing aggregated site, one can deduce the overall survivability, the probability of at least 2 aggregated sites being available, is:

$$\sum_{k=2}^{4} \binom{4}{k} 0.9^k (1-0.9)^{4-k} = 0.9963. \quad (11)$$

Without the shared-redundancy, one would assume that each aggregated site now only stores one of the data 210, $S_1$, $S_2$, $S_3$ and $S_4$, and then deduce that the required survivability, the probability of exactly 4 aggregated sites being available, would be $0.9^4 = 0.6561$.

One can compare the WF pre/post-transform technologies with RAID based on the architecture in FIG. 2. For a RAID technology that performs mirroring such that $S_1$ is stored in 262, $S_2$ in 264, $S_3$ in 266, and $S_4$ in 268, the RAID technology fails to provide data survivability if the aggregated sites 262 and 264 are not available. The RAID technology also fails if the aggregated sites 266 and 268 are not available. For a RAID technology that forms 4 parity sets and transport the 4 data sets to 4 sites 241, 242, 243, and 244, and the 4 parity sets to 4 sites 245, 246, 247, and 248, it fails to protect the stored data set if unauthorized party eavesdrops on any site of 241, 242, 243, and 244. In contrast, each of the WFCs is not comprehensible, and/or may appear with misleading information to an unauthorized party.

Embodiment 7

Figure 10:
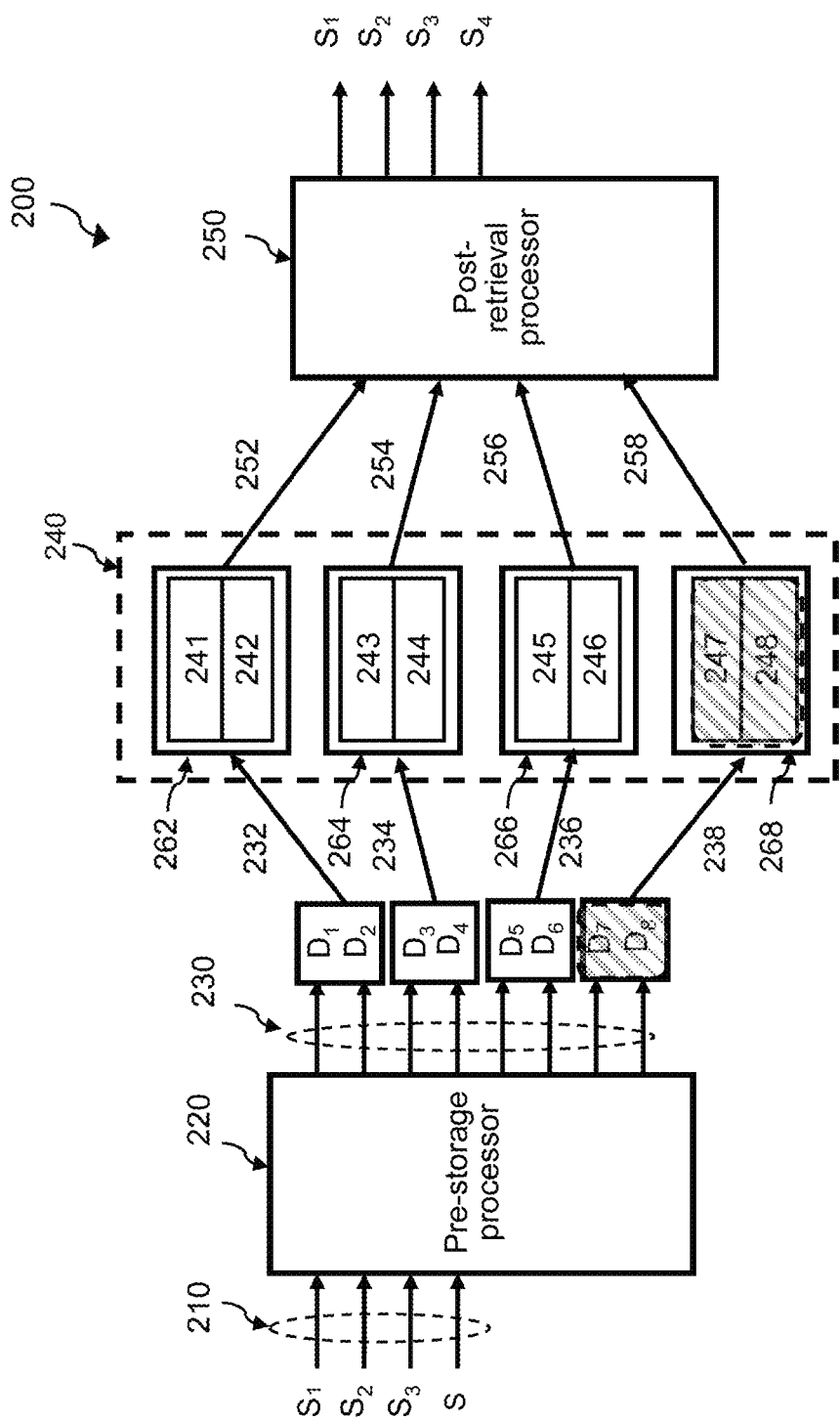
FIG. 10 is a diagram illustrating a data transport, storage, and retrieval processing system with wavefront components sharing links and two unavailable wavefront conponents according to one embodiment.

FIG. 10 is a diagram illustrating a data transport, storage, and retrieval processing system 200 with wavefront components sharing links and two unavailable wavefront components according to one embodiment. Similar to FIG. 9, FIG. 10 depicts an operation concept of using WF pre/post-transform techniques for storing 4 sets of data 210, $S_1$, $S_2$, $S_3$ and $S_4$, in 8 intended data storage sites 241, 242, 243, 244, 245, 246, 247, and 248. As stated in Embodiment 1, a pre-storage processor 220 performs WF pre-transformation that transforms the 4 data sets $S_1$, $S_2$, $S_3$ and $S_4$ to 230, the 8 WFCs $D_1$, $D_2$, $D_3$, $D_4$, $D_5$, $D_6$, $D_7$ and $D_8$. Two WFCs, $D_7$ and $D_8$, are however not available and cannot be retrieved by the post-retrieval processor 250.

The unavailability of $D_7$ and $D_8$ may be due to various circumstances along the path of 238-268-258: (1) link 238 is established or damaged, site 268 is functioning or damaged, but link 258 is damaged; (2) link 238 is established, link 258 is established or damaged, but site 268 is damaged; and (3) site 268 is functioning or damaged, link 258 is established or damaged, but link 238 is damaged.

The remaining 6 WFCs, $D_1$, $D_2$, $D_3$, $D_4$, $D_5$, and $D_6$, can be transported individually via 3 links, 252, 254, and 256, to the post-retrieval processor 250, which reconstitutes the 4 sets of data $S_1$, $S_2$, $S_3$ and $S_4$ by treating $D_7$ and $D_8$ as auxiliary unknown variables to be solved in the following equation:

$$\begin{bmatrix} D_1 \\ D_2 \\ D_3 \\ D_4 \\ D_5 \\ D_6 \\ 0 \\ 0 \\ 0 \\ 0 \\ 0 \\ 0 \end{bmatrix} = W_{12\text{-}by\text{-}10} \begin{bmatrix} S_1 \\ S_2 \\ S_3 \\ S_4 \\ S_5 \\ S_6 \\ S_7 \\ S_8 \\ D_7 \\ D_8 \end{bmatrix}. \quad (12)$$

The matrix $W_{12\text{-}by\text{-}10}$ represents a 12-by-10 matrix, as tabulated below.

| 1 | 1 | 1 | 1 | 1 | 1 | 1 | 1 | 0 | 0 |
|---|---|---|---|---|---|---|---|---|---|
| 1 | −1 | 1 | −1 | 1 | −1 | 1 | −1 | 0 | 0 |
| 1 | 1 | −1 | −1 | 1 | 1 | −1 | −1 | 0 | 0 |
| 1 | −1 | −1 | 1 | 1 | −1 | −1 | 1 | 0 | 0 |
| 1 | 1 | 1 | 1 | −1 | −1 | −1 | −1 | 0 | 0 |
| 1 | −1 | 1 | −1 | −1 | 1 | −1 | 1 | 0 | 0 |
| 1 | 1 | −1 | −1 | −1 | −1 | 1 | 1 | −1 | 0 |
| 1 | −1 | −1 | 1 | −1 | 1 | 1 | −1 | 0 | −1 |
| 0 | 0 | 0 | 0 | 1 | 0 | 0 | 0 | 0 | 0 |
| 0 | 0 | 0 | 0 | 0 | 1 | 0 | 0 | 0 | 0 |
| 0 | 0 | 0 | 0 | 0 | 0 | 1 | 0 | 0 | 0 |
| 0 | 0 | 0 | 0 | 0 | 0 | 0 | 1 | 0 | 0 |

FIG. 10 represents one of the $\binom{4}{1}=4$ cases in which one of the aggregated sites, $2i+260$, $i=1, \ldots, 4$, is not available. When exactly one aggregated site is missing, the post-retrieval processor 250 can reconstitute the 4 sets of data $S_1$, $S_2$, $S_3$ and $S_4$ by the remaining 3 aggregated sites, each of which is attached to established links $2k+230$ and $2k+250$, $k \neq i$. The post-retrieval processor 250 reconstitutes the 4 sets of data $S_1$, $S_2$, $S_3$ and $S_4$ by treating the two missing WFCs in the unavailable aggregated site $2i+260$ as auxiliary unknown variables to be solved.

Embodiment 8

Figure 11:
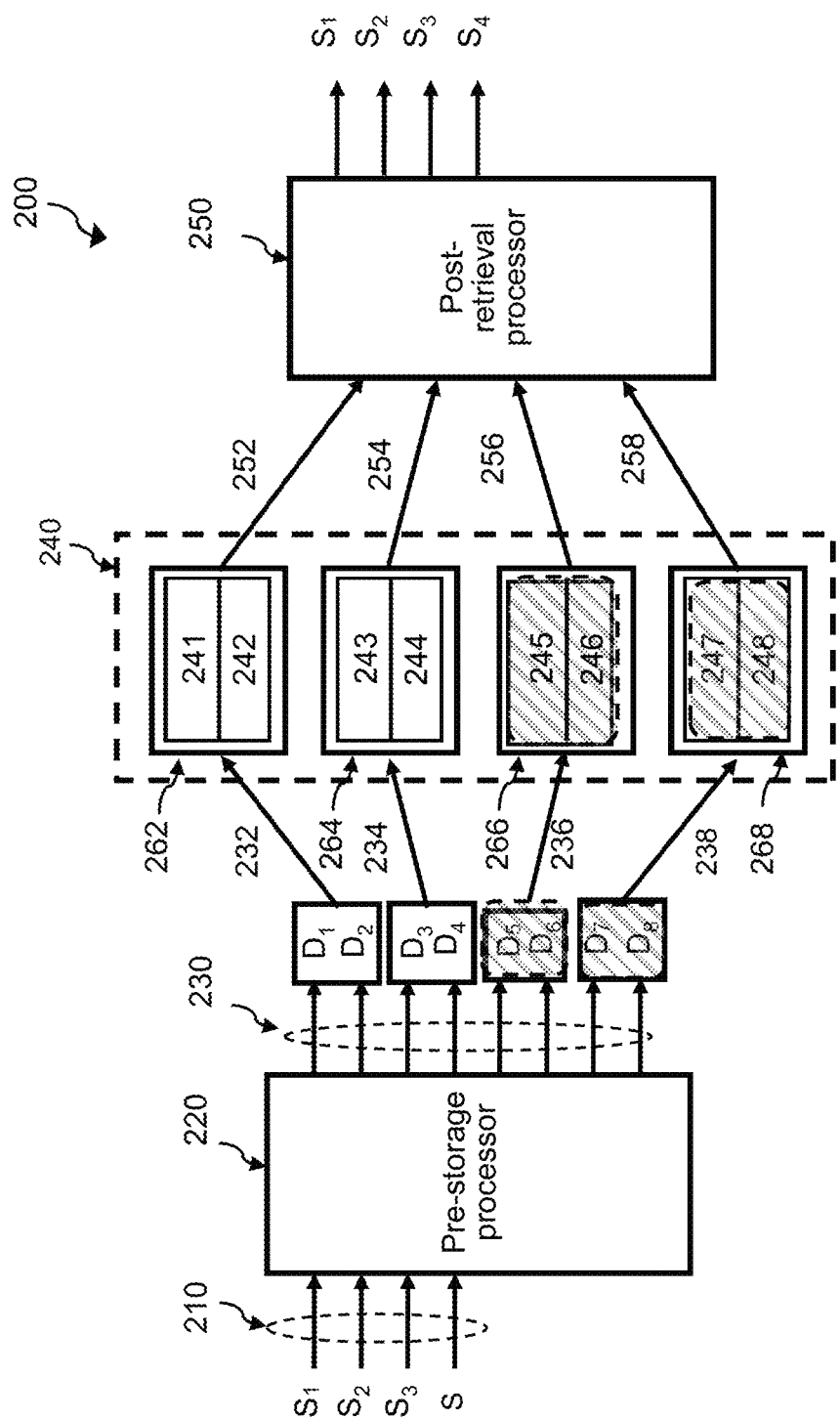
FIG. 11 is a diagram illustrating a data transport, storage, and retrieval processing system with wavefront components sharing links and four unavailable wavefront conponents according to one embodiment.

FIG. 11 is a diagram illustrating a data transport, storage, and retrieval processing system 200 with wavefront components sharing links and four unavailable wavefront components according to one embodiment. Similar to FIG. 9, FIG. 11 depicts an operation concept of using WF pre/post-transform techniques for storing 4 sets of data 210, $S_1$, $S_2$, $S_3$ and $S_4$, in 8 intended data storage sites 241, 242, 243, 244, 245, 246, 247, and 248. As stated in Embodiment 1, a pre-storage processor 220 performs WF pre-transformation that transforms the 4 data sets $S_1$, $S_2$, $S_3$ and $S_4$ to 230, the 8 WFCs $D_1$, $D_2$, $D_3$, $D_4$, $D_5$, $D_6$, $D_7$ and $D_8$. Two aggregated sites, 266 and 268, and the stored WFCs $D_5$, $D_6$, $D_7$ and $D_8$, are however not available and cannot be retrieved by the post-retrieval processor 250.

The unavailability of $D_5$ and $D_6$ may be due to various circumstances along the path of 236-266-256: (1) link 236 is established or damaged, site 266 is functioning or damaged, but link 256 is damaged; (2) link 236 is established, link 256 is established or damaged, but site 266 is damaged; and (3) site 266 is functioning or damaged, link 256 is established or damaged, but link 236 is damaged.

The unavailability of $D_7$ and $D_8$ may be due to various circumstances as stated in Embodiment 7.

The remaining 4 WFCs, $D_1$, $D_2$, $D_3$, and $D_4$, can be transported individually via 2 links, 252 and 254, to the post-retrieval processor 250, which reconstitutes the 4 sets of data $S_1$, $S_2$, $S_3$ and $S_4$ by treating $D_5$, $D_6$, $D_7$ and $D_8$ as auxiliary unknown variables to be solved in the following equation:

$$\begin{bmatrix} D_1 \\ D_2 \\ D_3 \\ D_4 \\ 0 \\ 0 \\ 0 \\ 0 \\ 0 \\ 0 \\ 0 \\ 0 \end{bmatrix} = W_{12\text{-}by\text{-}12} \begin{bmatrix} S_1 \\ S_2 \\ S_3 \\ S_4 \\ S_5 \\ S_6 \\ S_7 \\ S_8 \\ D_5 \\ D_6 \\ D_7 \\ D_8 \end{bmatrix}. \quad (13)$$

The matrix $W_{12\text{-}by\text{-}12}$ represents a 12-by-12 matrix, as tabulated below.

| 1 | 1 | 1 | 1 | 1 | 1 | 1 | 1 | 0 | 0 | 0 | 0 |
|---|---|---|---|---|---|---|---|---|---|---|---|
| 1 | -1 | 1 | -1 | 1 | -1 | 1 | -1 | 0 | 0 | 0 | 0 |
| 1 | 1 | -1 | -1 | 1 | 1 | -1 | -1 | 0 | 0 | 0 | 0 |
| 1 | -1 | -1 | 1 | 1 | -1 | -1 | 1 | 0 | 0 | 0 | 0 |
| 1 | 1 | 1 | 1 | -1 | -1 | -1 | -1 | -1 | 0 | 0 | 0 |
| 1 | -1 | 1 | -1 | -1 | 1 | -1 | 1 | 0 | -1 | 0 | 0 |
| 1 | 1 | -1 | -1 | -1 | -1 | 1 | 1 | 0 | 0 | -1 | 0 |
| 1 | -1 | -1 | 1 | -1 | 1 | 1 | -1 | 0 | 0 | 0 | -1 |
| 0 | 0 | 0 | 0 | 1 | 0 | 0 | 0 | 0 | 0 | 0 | 0 |
| 0 | 0 | 0 | 0 | 0 | 1 | 0 | 0 | 0 | 0 | 0 | 0 |
| 0 | 0 | 0 | 0 | 0 | 0 | 1 | 0 | 0 | 0 | 0 | 0 |
| 0 | 0 | 0 | 0 | 0 | 0 | 0 | 1 | 0 | 0 | 0 | 0 |

FIG. 11 represents one of the 6 cases in which two of the aggregated sites 2i+260 and 2j+260, i,j ∈ {i≠j,i,j=1, . . . ,4}, are not available. When exactly two aggregated sites are missing, the post-retrieval processor 250 may reconstitute the 4 sets of data $S_1$, $S_2$, $S_3$ and $S_4$ by the remaining 2 aggregated sites, each of which is attached to established links 2k+230 and 2k+250 k≠i, k≠j. The post-retrieval processor 250 reconstitutes the 4 sets of data $S_1$, $S_2$, $S_3$ and $S_4$ by treating the four missing WFCs in the unavailable aggregated sites 2i+260 and 2j+260 as auxiliary unknown variables to be solved.

Remote wiping for transported or retrieved data

Figure 12:
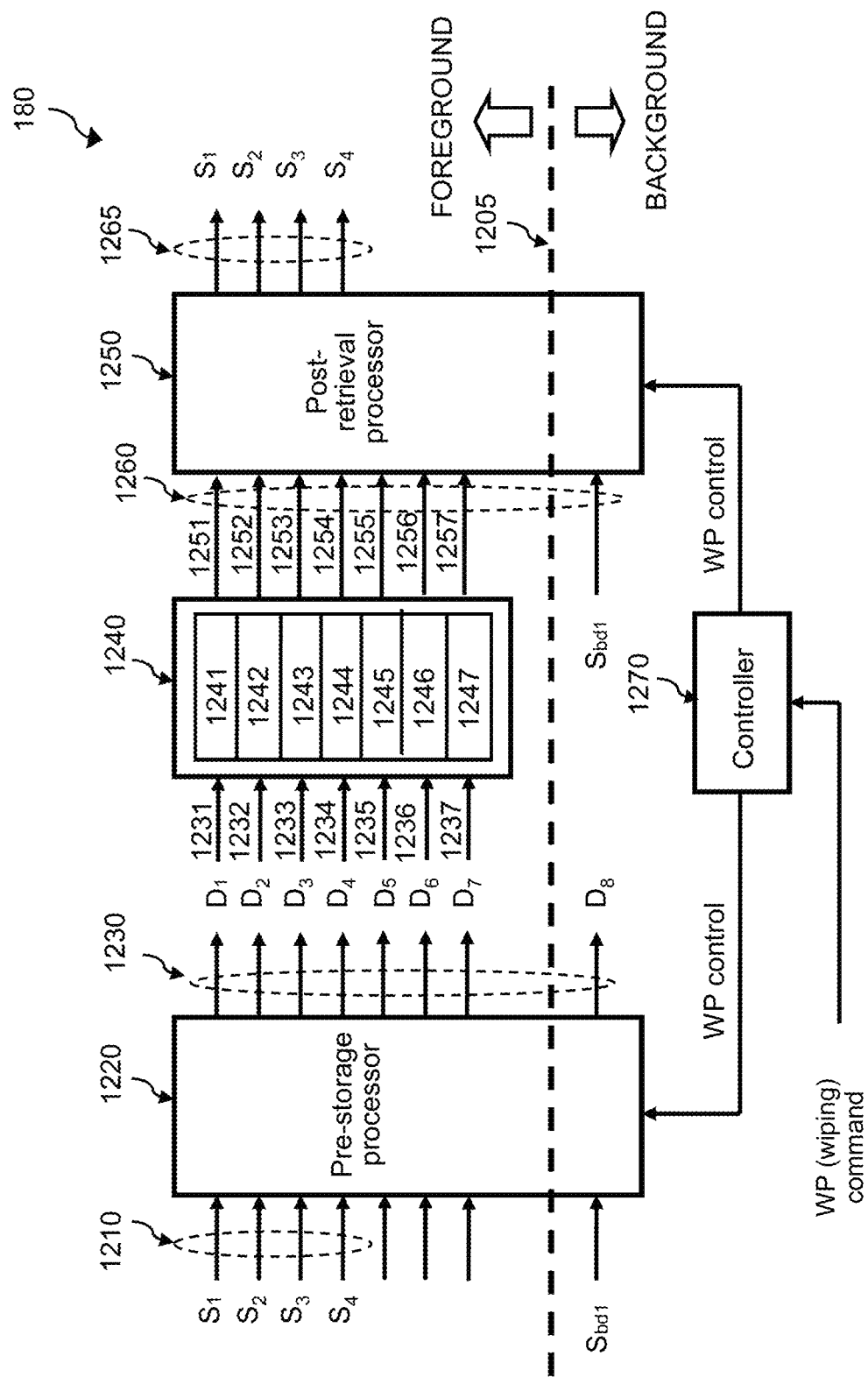
FIG. 12 is a diagram illustrating a data transport, storage, and retrieval processing system with remote wiping according to one embodiment.

FIG. 12 is a diagram illustrating a data transport, storage, and retrieval processing subsystem 180 using wavefront transform technology with remote wiping according to one embodiment. The subsystem 180 includes a pre-storage processor 1220, a remote storage area 1240, a post-retrieval processor 1250, and a controller 1270.

The pre-storage processor 1220 and the post-retrieval processor 1250 are similar to the pre-storage processor 220 and the post-retrieval processor 250, respectively, shown in FIG. 2. The remote storage area 1240 is fully or partially connected to a network (e.g., the network 170 in FIG. 1) and may have remote storage sites 1241, 1242, 1243, 1244, 1245, 1246, and 1247. The controller 1270 performs control operations on the pre-storage processor 1220 and the post-retrieval processor 1250. One control function is to receive a wiping (WP) command and generates a WP control signal to the pre-storage processor 1220 and the post-retrieval processor 1250. The controller 1270 may be external (as shown in FIG. 12) or internal to the pre-storage processor 1220 and the post-retrieval processor 1250.

Similar to FIG. 2, FIG. 12 exemplifies an operation of remote wiping using WF pre/post-transform techniques. An 8-to-8 WF pre-transform is for storing 4 sets of data 1210, $S_1$, $S_2$, $S_3$ and $S_4$, in 7 physically separated data storage sites 1241, 1242, 1243, 1244, 1245, 1246, and 1247. The 4 sets of data 1210 can represent 4 files of identical size, or 4 segments of identical size that are outcome of all possible manipulations on a single file or multiple files. The pre-storage processor 1220 performs the 8-to-8 WF pre-transformation that converts the 4 data sets $S_1$, $S_2$, $S_3$ and $S_4$ to 1230, the 8 WFCs $D_1$, $D_2$, $D_3$, $D_4$, $D_5$, $D_6$, $D_7$ and $D_8$. The pre-storage processor 1220 can also perform the WF pre-transform by taking 3 additional zero data sets as inputs as if these 3 zero data sets were grounded circuit input pins. An additional known data stream $S_{bd1}$ is inserted as the input to the remaining input port; where $S_{bd1}$ only known to an operator or administrator for the cloud storage or transport.

A dotted line 1205 divides the operational space into two regions: foreground and background. The functions above the line are the functions in a foreground domain or in foreground, and those below the line are those in a background domain or in background. The foreground domain is the domain that is available to a user. The background domain is the domain that is not available to a user. As an example, the input $S_{bd1}$ connected to the $8^{th}$ logical input port and the output $D_8$ connected to the $8^{th}$ logical output port are in background and are not available to users.

There will only be 7 input ports from the pre-processor 1220 available to a user in the foreground. The "remaining" input port is reserved for the operators/administrators in the background and may be port No. 8, port no. 4, or any one of the 8 "physical" inputs.

Figure 13:
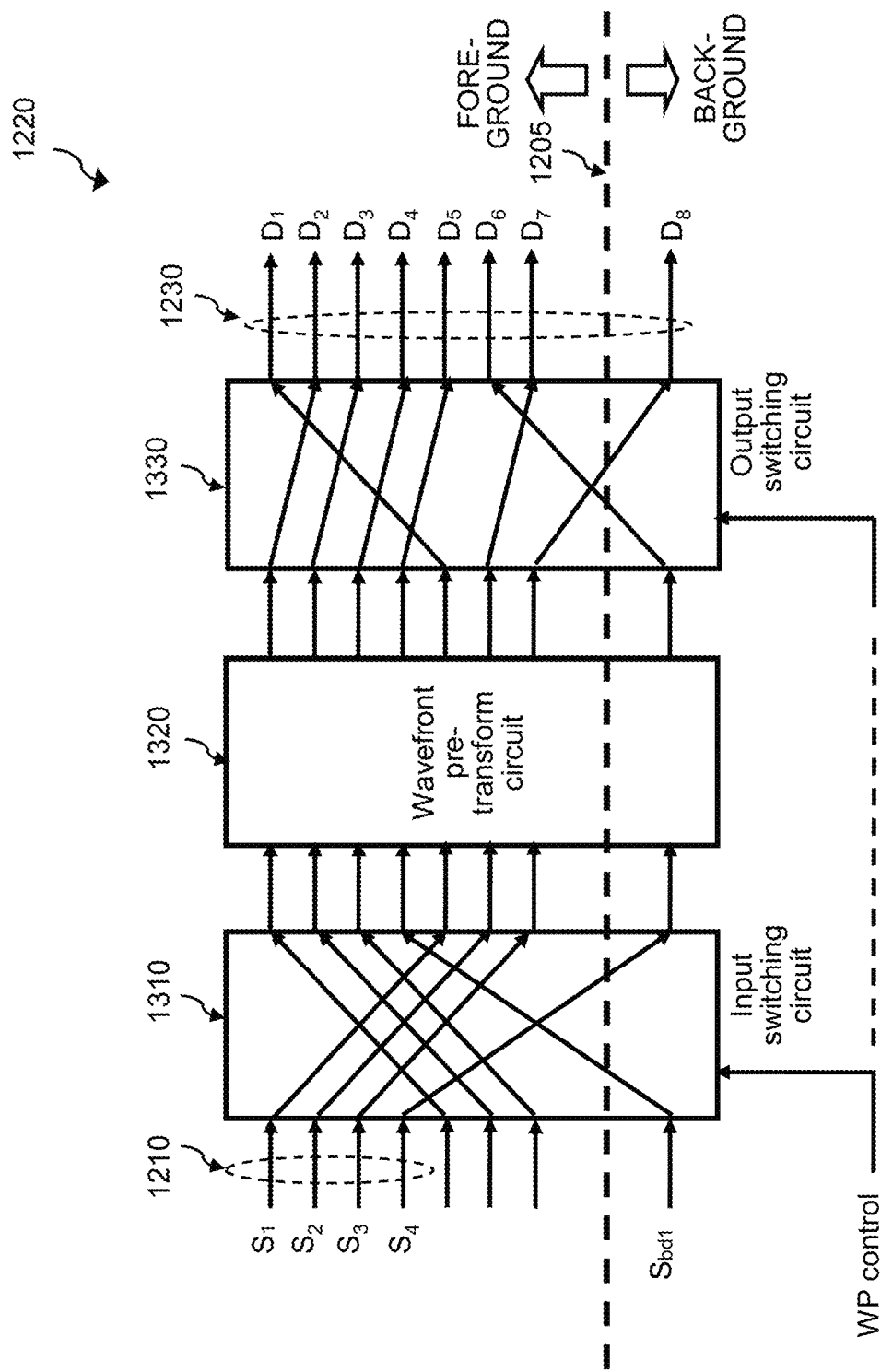
FIG. 13 is a diagram illustrating an architecture of a pre-storage processor according to one embodiment.

FIG. 13 is a diagram illustrating an architecture of a pre-storage processor 1220 according to one embodiment. The pre-storage processor 1220 includes an input switching circuit 1310, a wavefront pre-transform circuit 1320, and an output switching circuit 1330.

The input switching circuit 1310 is configured to dynamically connect, based on an input mapping table, input streams 1210 to the inputs of the wavefront pre-transform circuit 1320. The input switching circuit 1310 may be implemented by a reconfigurable circuit such as a field programmable gate array (FPGA) or an application specific integrated circuit (ASIC). Alternatively, it may be implemented by software in which the data are routed or switched using memory arrays via index changes. The wavefront pre-transform circuit 1320 has inputs and outputs and is configured to transform input data at the inputs to output data at the outputs using a wavefront pre-processing transform. The wavefront pre-processing transform may include one of an orthogonal matrix transform, a mathematical function of a non-orthogonal and a full rank matrix transform, a Hadamard transform, and a Fourier transform. The output switching circuit 1330 is configured to dynamically connect, based on an output mapping table, the output data at the outputs to transport streams. Similar to the input switching circuit 1310, the output switching circuit 1330 may be implemented by a reconfigurable circuit such as an FPGA or an ASIC. Alternatively, it may be implemented by software in which the data are routed or switched using memory arrays via index changes. The input switching circuit 1310 and the output switching circuit 1330 receive a wiping (WP) control signal from the controller 1270.

The controller 1270 is configured to control, based on a wiping command, at least one of the input and output switching circuits 1310 and 1330 to alter at least one of the input and output mapping tables such that the at least one of the input and output switching circuits 1310 and 1330 is disabled for connection.

A first subset of the transport streams 1230 operates in a foreground mode available to a user and is transported for storage in remote storage sites 1241, 1242, 1243, 1244, 1245, 1246, and 1247 at a network (e.g., network 170 in FIG. 1) and a second subset of the transport streams 1230 operates in a background mode available to an administrator and is not transported for storage in the remote storage sites 1241, 1242, 1243, 1244, 1245, 1246, and 1247.

Figure 14:
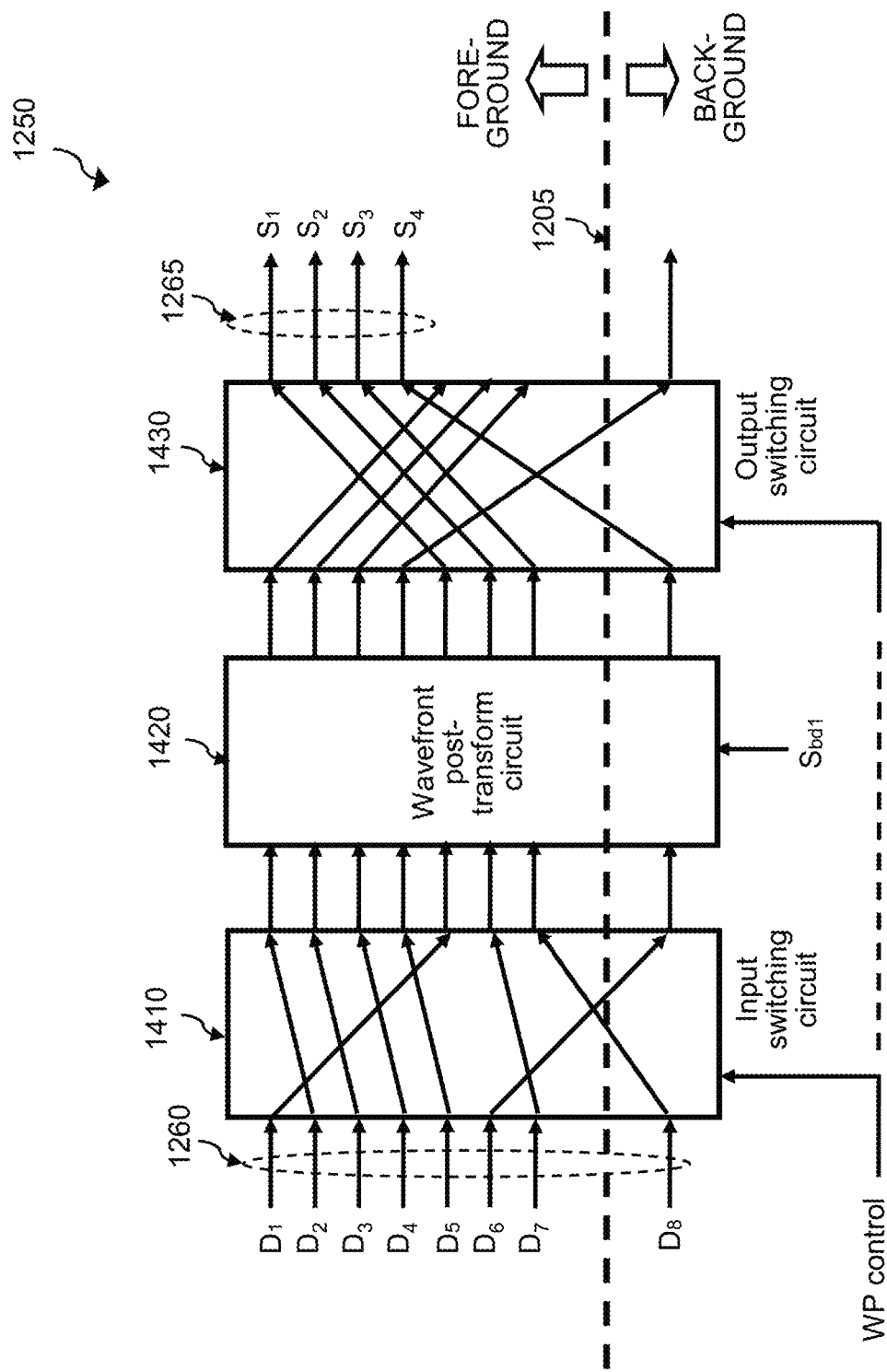
FIG. 14 is a diagram illustrating an architecture of a post-storage processor according to one embodiment.

FIG. 14 is a diagram illustrating an architecture of a post-storage processor 1250 according to one embodiment. The post-storage processor 1250 includes an input switching circuit 1410, a wavefront post-transform circuit 1420, and an output switching circuit 1430.

The input switching circuit 1410 is configured to dynamically connect, based on an input mapping table, input streams 1260 to the inputs of the wavefront post-transform circuit 1420. The wavefront post-transform circuit 1420 has inputs and outputs and is configured to transform input data at the inputs to output data at the outputs using a wavefront post-processing transform. The wavefront post-processing transform includes one of an inverse orthogonal matrix transform, an inverse mathematical function of a non-orthogonal and full rank matrix transform, an inverse Hadamard transform, and an inverse Fourier transform. The output switching circuit 1430 is configured to dynamically connect, based on an output mapping table, the output data at the outputs to retrieval streams. The input switching circuit 1410 and the output switching circuit 1430 receive a wiping (WP) control signal from the controller 1270. The implementation of the input switching circuit 1410 and the output switching circuit 1430 is similar to that of the input switching circuit 1310 and the output switching circuit 1330 shown in FIG. 13.

The controller 1270 is configured to control, based on a wiping command, at least one of the input and output switching circuits 1410 and 1430 to alter at least one of the input and output mapping tables such that the at least one of the input and output switching circuits 1410 and 1430 is disabled for connection.

A first subset of the input streams 1260 operates in a foreground mode available to a user and is transported for storage in remote storage sites 1241, 1242, 1243, 1244, 1245, 1246, and 1247 at a network (e.g., network 170 in FIG. 1) and a second subset of the input streams 1260 operates in a background mode available to an administrator and is not transported for storage in the remote storage sites 1241, 1242, 1243, 1244, 1245, 1246, and 1247.

As depicted in FIG. 13, we may refer to the 8 inputs of the pre-processor 1220 as logical inputs which are mapped into the 8 physical inputs of the 8-to-8 WF pre-transform circuit 1320 by an input mapping table 1510 (shown in FIG. 15) which is configurable by an authorized operator/administrator or users. The mapping table may also be used for the physical outputs of the 8-to-8 WF pre-transform circuit 1320 and the logical outputs of the pre-processor 1220. However, the output mapping table 1530 (shown in FIG. 15) in many cases is very different from the input mapping table 1510.

Many remote wiping methods via operating systems for a digital device will force the device converted back to a default state of a user's choice or a manufacturer-set default state in both writing and reading modes. In a remote wiping mode for WF pre-transformed data storage techniques in FIG. 12, the backdoor data stream, $S_{bd1}$, will be disconnected from the pre-storage processor 1220, and the input and output mapping tables 1510 and 1530 in FIG. 15 will be altered. As an example, the mapping tables 1510 and 1530 may become a configuration status of non-connection, so that the embedded WF pre-transform are not connected at all to any of the inputs/outputs (I/O) of the pre-storage processor 1220.

FIG. 12 also shows a retrieval process of the 4 sets of data. First seven of the 8 WFCs, logical outputs 1230, are transported to 7 storage sites 1241, 1242, 1243, 1244, 1245, 1246, and 1247 chosen by a user individually through 7 different links 1231, 1232, 1233, 1234, 1235, 1236, and 1237. When demanded by the user, the 7 stored WFCs can be retrieved through 7 different links 1251, 1252, 1253, 1254, 1255, 1256, and 1257 (as indicated in FIG. 14 as well) and be transformed to the original data $S_1$, $S_2$, $S_3$ and $S_4$ by the post-retrieval processor 1250 that performs a WF post-transform 1420 with a known a priori data stream $S_{bd1}$ as a part of the inputs to the post-retrieval processor 1250. An input mapping table 1610 (shown in FIG. 16) and an output mapping table 1630 (shown in FIG. 16) are also depicted.

It is clear that without the known a priori data stream $S_{bd1}$, the post-retrieval processor 1250 would not have sufficient information or data sets to reconstitute the original input data streams S1, S2, S3, and S4 at all. Therefore, by denying the access to the known a priori data stream $S_{bd1}$, the data recovery or reconstituting process will be efficiently disabled in the WF post-transform 1420. It is a sufficient action on a digital device to remotely wipe off capability of accessing WF pre-transformed data distributed on cloud or/and local storages. One might issue a wipe command to a device when one needs to secure a lost device or when one retires a device from active use. The device may be a mobile device.

Figure 16:
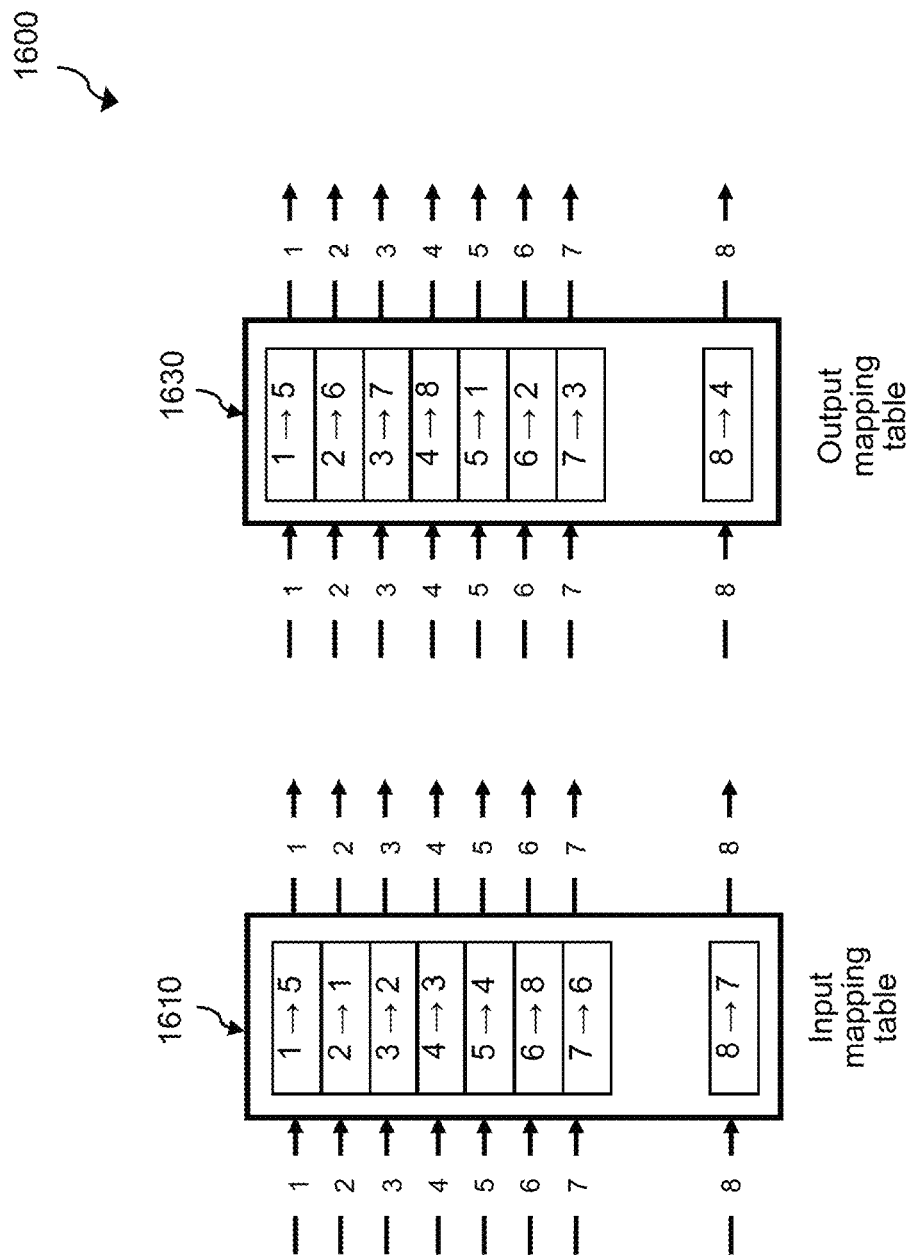
FIG. 16 is a diagram illustrating post-transform mapping tables according to one embodiment.

In a remote wiping mode, the backdoor data stream, $S_{bd1}$, will be disconnected also from the post-retrieval processor 1250, and the input and output mapping tables 1610 and 1630 in FIG. 16 will be altered. It is clear from FIG. 14 and FIG. 16 that the original data streams will not be reconstituted correctly from the stored data distributed over cloud without either a right input mapping table 1610 or a right output mapping table 1630. We may change these mapping tables as additional wiping mechanisms to assure that the disabled device is not able to recover original data streams from distributed data stored on cloud or transported in cloud.

As a result of the background reservation of one input port and one output port on the WF pre-transform circuit 1320 assets by an authority, the pre-storage processor 1220 and the corresponding post-retrieval processor 1250 equivalently features only a 7-to-7 WF pre/post-transforms, not an 8-to-8 WF post-transform, as far as a user is concerned.

The 7 physically distributed storage sites 1241, 1242, 1243, 1244, 1245, 1246, and 1247 can represent 7 locations in user's registered cloud space, or 6 sites in user's registered cloud space and 1 user's storage device, or 5 sites in user's registered cloud space and 2 user's storage devices, or any combination of sites in users' registered cloud space and user's storage devices. In general, these 7 sites can represent i locations in user's registered cloud space and 7-i user's storage devices, where i=0 . . . 7.

The $8^{th}$ output $D_8$ is in the background and will not be available to the users. It may or may not be stored by the authority at all.

It is noticed that the boundary line 1205 in FIG. 12, FIG. 13, and FIG. 14 is drawn to include at least 1 input port for the WF pre-transform circuit 1320 and at least one input port for the WF post-transform circuit 1420 for the background operation. It is possible to configure an operation featuring a 8-to-8 WF pre-transform circuit 1320 and a corresponding 8-to-8 WF post-transform circuit 1420, from an operational mode to have all assets in the foreground as a first option, to an $8^{th}$ option in which only one of the 8 inputs of the WF pre-transform and the corresponding WF post-transform is in the foreground and the remaining 7 inputs stay in the background. The first option needs 8 distributed storages or 8 parallel channels for data transport, while the $8^{th}$ option needs only one storage for data storage or one channel via cloud for data transport.

An architecture of data storage and transport with the remote wiping capability features an N-to-N pre-storage processor 1220, in which N-Nb input ports are in foreground for subscribers or users and Nb input ports for applications in background. The digital streams connected to the Nb input ports, referred to backdoor data streams, are not available to the subscribers and users in the foreground. However, they are embedded in all the N outputs of the N-to-N pre-storage processor 1220; including the one accessible by the subscribers and users in the foreground.

Figure 15:
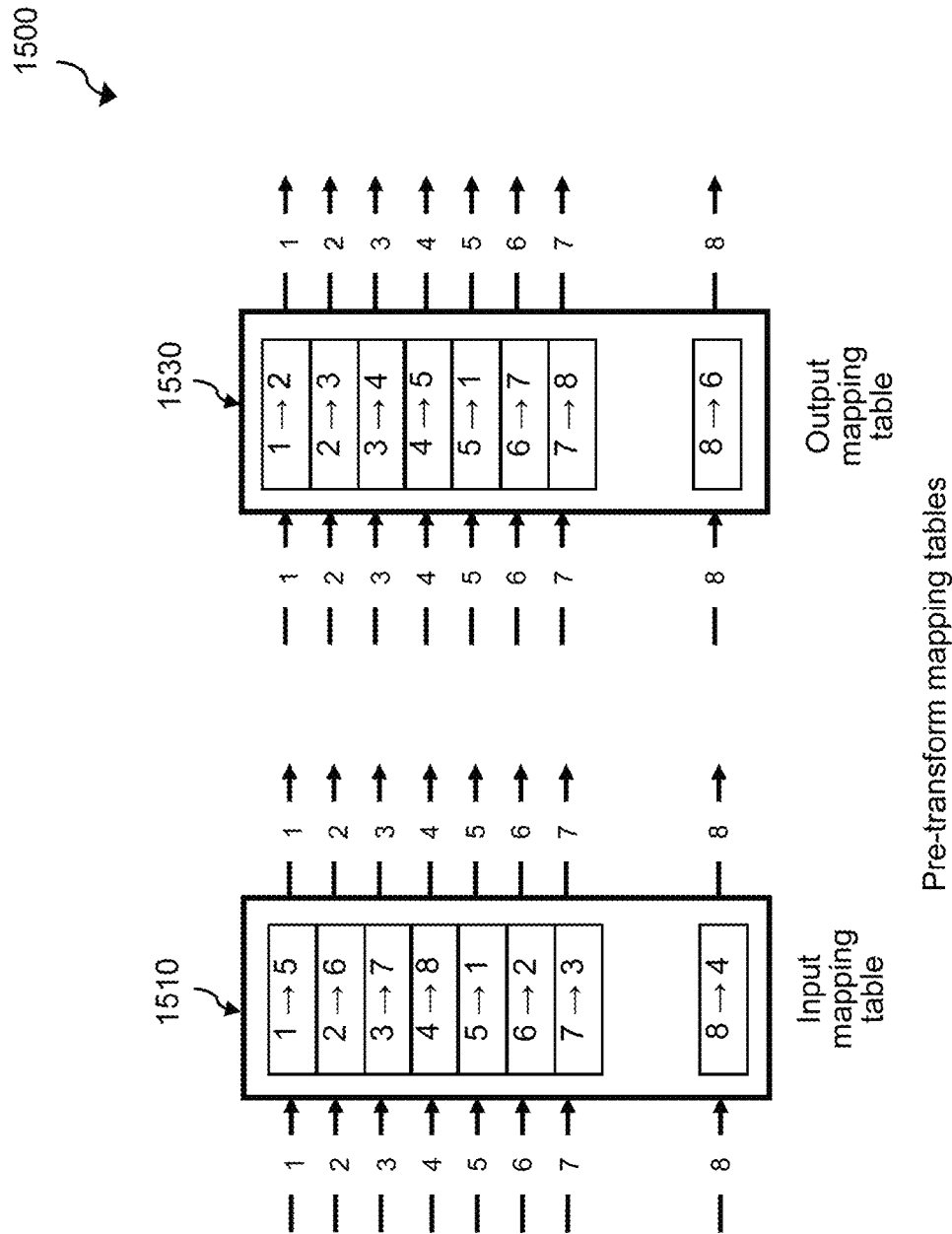
FIG. 15 is a diagram illustrating pre-transform mapping tables according to one embodiment.

FIG. 15 is a diagram illustrating pre-transform mapping tables according to one embodiment. The pre-transform mapping tables include an input mapping table 1510 and an output mapping table 1530.

The input mapping table 1510 and the output mapping table 1530 provide the logical mapping of the input lines to the output lines of the input switching circuit 1310 and the output switching circuit 1330, respectively. The mapping table corresponds to the physical connections between the input lines and the output lines of the corresponding switching circuit. For example, in FIG. 15, the input mapping table 1510 shows that n→m, which means the input line n is connected to output line m. This may be implemented as a look-up table where the content of location n is m, or the content of the memory location pointed to by the index n of the array T(k) is m. The output mapping table 1520 uses a similar mechanism.

At least one of the input mapping table 1510 and the output mapping table 1530 is a one-to-one mapping table. The one-to-one mapping table may include one of an arbitrary predetermined pattern, a random pattern, a perfect shuffle pattern, and a butterfly pattern.

FIG. 16 is a diagram illustrating post-transform mapping tables according to one embodiment. The post-transform mapping tables include an input mapping table 1610 and an output mapping table 1630.

The input mapping table 1610 and the output mapping table 1630 provide the logical mapping of the input lines to the output lines of the input switching circuit 1410 and the output switching circuit 1430, respectively. The mapping table corresponds to the physical connections between the input lines and the output lines of the corresponding switching circuit. For example, in FIG. 16, the input mapping table 1610 shows that n→m, which means the input line n is connected to output line m. This may be implemented as a look-up table where the content of location n is m, or the content of the memory location pointed to by the index n of the array T(k) is m. The output mapping table 1630 uses a similar mechanism. Typically, the input mapping table 1610 and the output mapping table 1630 of the post-retrieval processor 1250 contain connections mappings that are reverse of the connection mappings in the input mapping table 1510 and the output mapping table 1530 of the pre-storage processor 1220.

At least one of the input mapping table 1610 and the output mapping table 1630 is a one-to-one mapping table. The one-to-one mapping table may include one of an arbitrary predetermined pattern, a random pattern, a perfect shuffle pattern, and a butterfly pattern.

Figure 17:
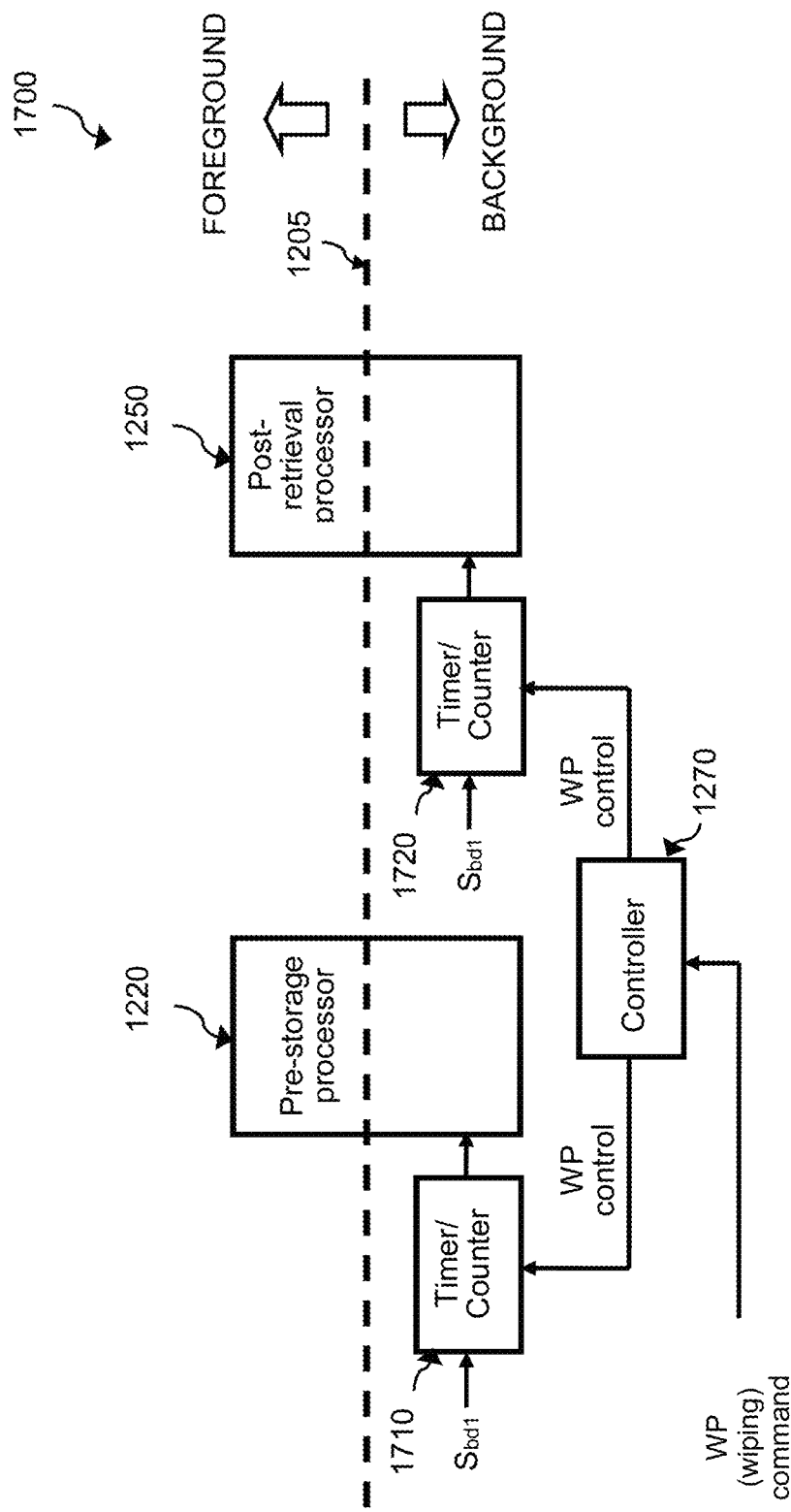
FIG. 17 is a diagram illustrating a data transport, storage, and retrieval processing system with remote wiping using timer/counter according to one embodiment.

FIG. 17 is a diagram illustrating a data transport, storage, and retrieval processing system 1700 with remote wiping using timer/counter according to one embodiment. The system 1700 includes the pre-storage processor 1220, the post-storage processor 1250, the controller 1270, a timer/counter 1710, and a timer/counter 1720. The pre-storage processor 1220, the post-storage processor 1250, and the controller 1270 are discussed above in FIG. 12.

The timer/counter 1710 or the timer/counter 1720 generates timing interval Δt to determine when the backdoor data stream becomes available, or the count for number of downloads.

The time interval Δt is used as follows. Once a WF post-transform circuit 1420 is activated at $T_0$ by a subscriber or user for data recovery of [S1, S2, S3, S4] from [D1, D2, ... D7] as shown in FIG. 14, the backdoor data stream, $S_{bd1}$, will be available only until $T_0+\Delta t$; where Δt can be set at 2 minutes, two hours, 4 hours, 6 hours, 24 hours, or longer. $S_{bd1}$ will be disconnected at $T_0+\Delta t$, and the links 1251, 1252, 1253, 1254, 1255, 1256, and 1257 to WF pre-transformed data [D1, ... , D7] or the WF pre-transformed data will be removed at $T_0+\Delta T$, where ΔT>Δt. We may set Δt at 6 hours and ΔT at 120 hours. The subscriber or the user may decide to access the stored data again after $T_0+\Delta t$ but before $T_0+\Delta T$ by reconnecting $S_{bd1}$ in the background through a data storage operator or authority.

The count for number of downloads is used as follows. Once a WF post-transform circuit 1420 is activated at a first time N=1 by a subscriber or user for data recovery of [S1, S2, S3, S4] from [D1, D2, ... ,D7] as shown in FIG. 14, the backdoor data stream, $S_{bd1}$, will be available only until $N=N_{out}$; where $N_{out}$ can be set at 2, 20, or a larger integer. $S_{bd1}$ will be disconnected after $N_{out}$, and the links 1251, 1252, 1253, 1254, 1255, 1256, and 1257 to WF pre-transformed data [D1, ... , D7] or the WF pre-transformed data will be removed at ΔT after $N_{out}$. We may set ΔT at 24 hours, 36 hours, or longer. The subscriber or the user may decide to access the stored data again after $N_{out}$ but before ΔT by reconnecting $S_{bd1}$ in the background through a data storage operator or authority.

Figure 18:
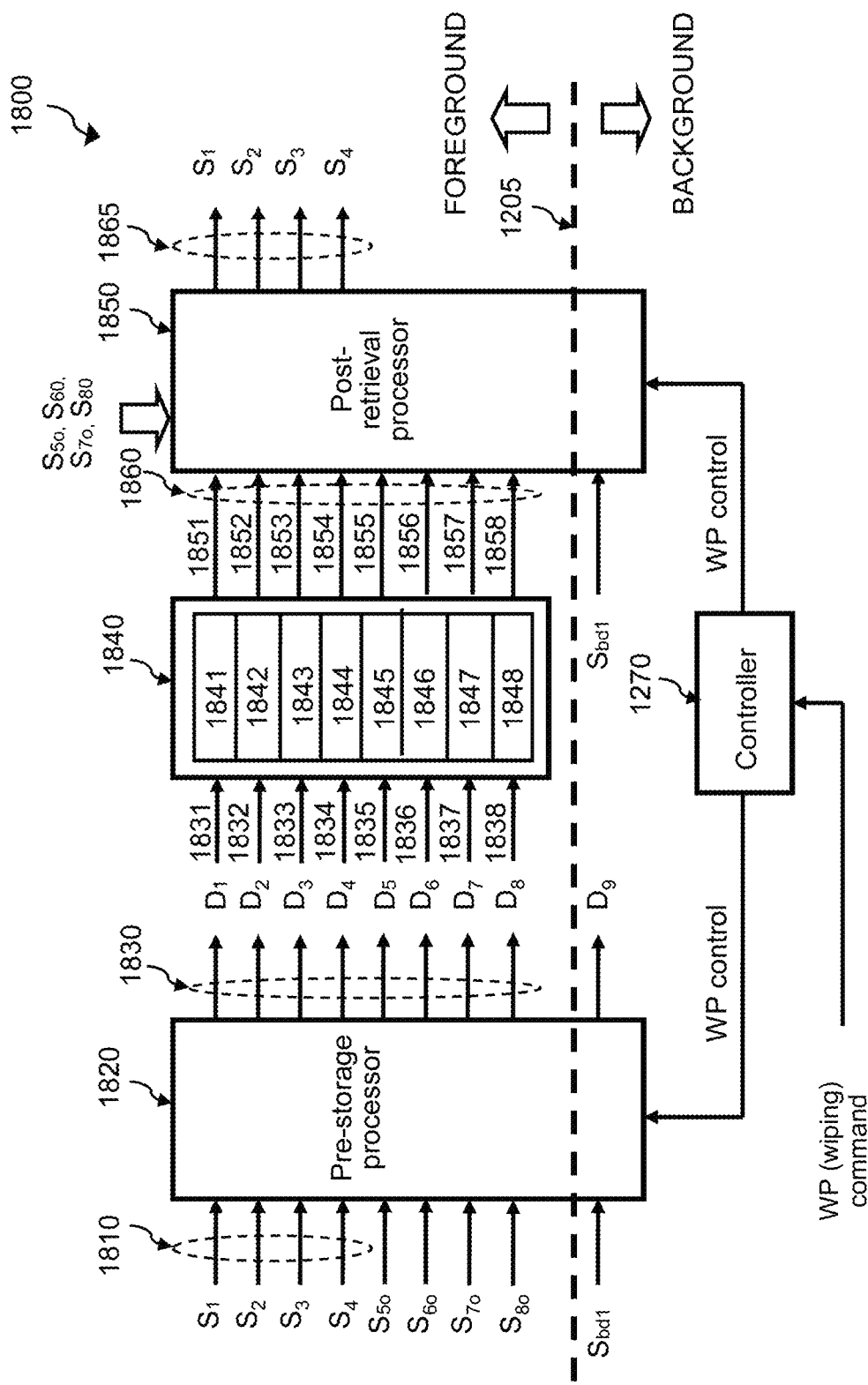
FIG. 18 is a diagram illustrating a data transport, storage, and retrieval processing system with remote wiping and known a priori data streams according to one embodiment.

FIG. 18 is a diagram illustrating a data transport, storage, and retrieval processing system 1800 with remote wiping and known a priori data streams according to one embodiment. The system 1800 includes a pre-storage processor 1820, a remote storage area 1840, a post-retrieval processor 1850, and the controller 1270.

The pre-storage processor 1820 and the post-retrieval processor 1850 are similar to the pre-storage processor 1220 and the post-retrieval processor 1250, respectively, shown in FIG. 12. The remote storage area 1840 is connected to a network (e.g., the network 170 in FIG. 1) and may have remote storage sites 1841, 1842, 1843, 1844, 1845, 1846, 1847, and 1848. The controller 1270 performs control operations on the pre-storage processor 1820 and the post-retrieval processor 1850, as discussed above.

FIG. 18 depicts another example of cloud data storage and transport with a feature of remote wiping capability. It is an example with N=9 and Nb=1. As far as users in the foreground are concerned, the WF pre-transform circuit 1320 (shown in FIG. 13) is equivalent to have an operation of an 8x8 matrix. The inputs are $S_1$, $S_2$, $S_3$, $S_4$, $S_{5_o}$, $S_{6_o}$, $S_{7_o}$, and $S_{8_o}$; where $S_{5_o}$, $S_{6_o}$, $S_{7_o}$, and $S_{8_o}$ are known a priori. Let us further assume the input and output mapping tables 1510 and 1530 are feed-through tables. A feed through mapping table features an $i^{th}$ input connected to an $i^{th}$ output, where i ranges from 1 to 8.

In the background, the $9^{th}$ input data stream, $S_{bd1}$, may be a digital sample stream representing an image of running horses. The $9^{th}$ input data stream or the backdoor data stream, $S_{bd1}$, may be implemented in hardware as a part of an ASIC chip for a pre-storage processor 1820.

The associated WF pre-transform processing is either in a sample-by-sample or a block-by block operation. The samples may be with a fixed bit length; which may be chosen as 1 bit, 4 bits, 8 bits, 16 bits, 56 bits, or many others. Each sample will be considered as a number via its numerical value in the processing operation. In a block-to-block operation, multiple samples in a block will be considered as a number via their numerical value in the processing operation. Most block-by-block operations of a WF pre-transform processing use multiple samples in a fixed block length. In many other embodiments, the block-by-block operation of a WF pre-transform processing features input samples in a block with varying block length for each of the N inputs. The variations in block lengths usually follow a fixed or a predictable pattern.

In other embodiments, the ASIC chip shall appear with only 8 inputs and 8 outputs. The $9^{th}$ input, $S_{bd1}$, to an associated WF pre-transform embedded may originate from a local cache inside the ASIC chip. The local cache is programmable.

Similarly, all the Nb backdoor data streams must be incorporated in a post retrieval processor 1850 in order to reconstitute the original data streams $S_1$, $S_2$, $S_3$ and $S_4$. With accessing to the backdoor data stream $S_{bd1}$ and the 4 input data streams; $S_{5_o}$, $S_{6_o}$, $S_{7_o}$ and $S_{8_o}$, the post retrieval processor 1850 only needs 4 of the 8 WF pre-transformed data sets from cloud storages 1841, 1842, 1843, 1844, 1845, 1846, 1847, and 1848 for reconstituting the original data streams; $S_1$, $S_2$, $S_3$, and $S_4$.

Figure 19:
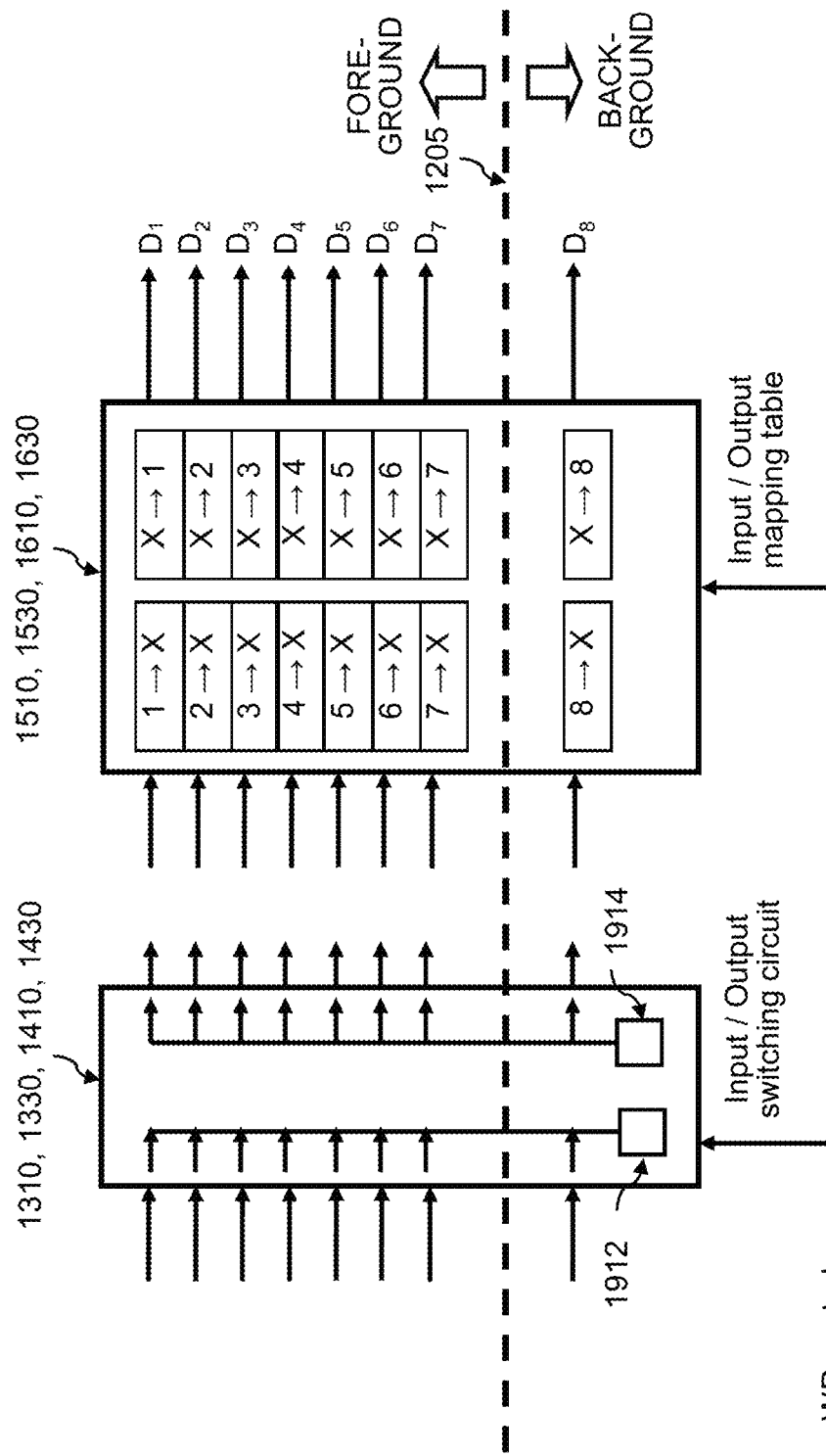
FIG. 19 is a diagram illustrating a remote wiping action on input and output switching circuits and mapping tables according to one embodiment.

FIG. 19 is a diagram illustrating a remote wiping action on input and output switching circuits and mapping tables according to one embodiment. The remote wiping action is activated when the WP control signal is asserted upon receipt of the WP command. It essentially is a reset operation to set the connections of in a switching circuit in a no-connection state or a pre-determined state. This predetermined state may be defined at the input or output of the switching circuits 1310, 1330, 1410, and 1430. For example, all input lines are connected to a default line (e.g., ground). Similarly, the mapping tables 1510, 1530, 1610, and 1630 may be set to a predetermined state where the input lines or output lines are mapped to a predetermined line (shown as X in FIG. 19). The result of setting the input lines and output lines to a pre-determined state is to disable the switching function or to set the connection state to a no-connection state.

Figure 20:
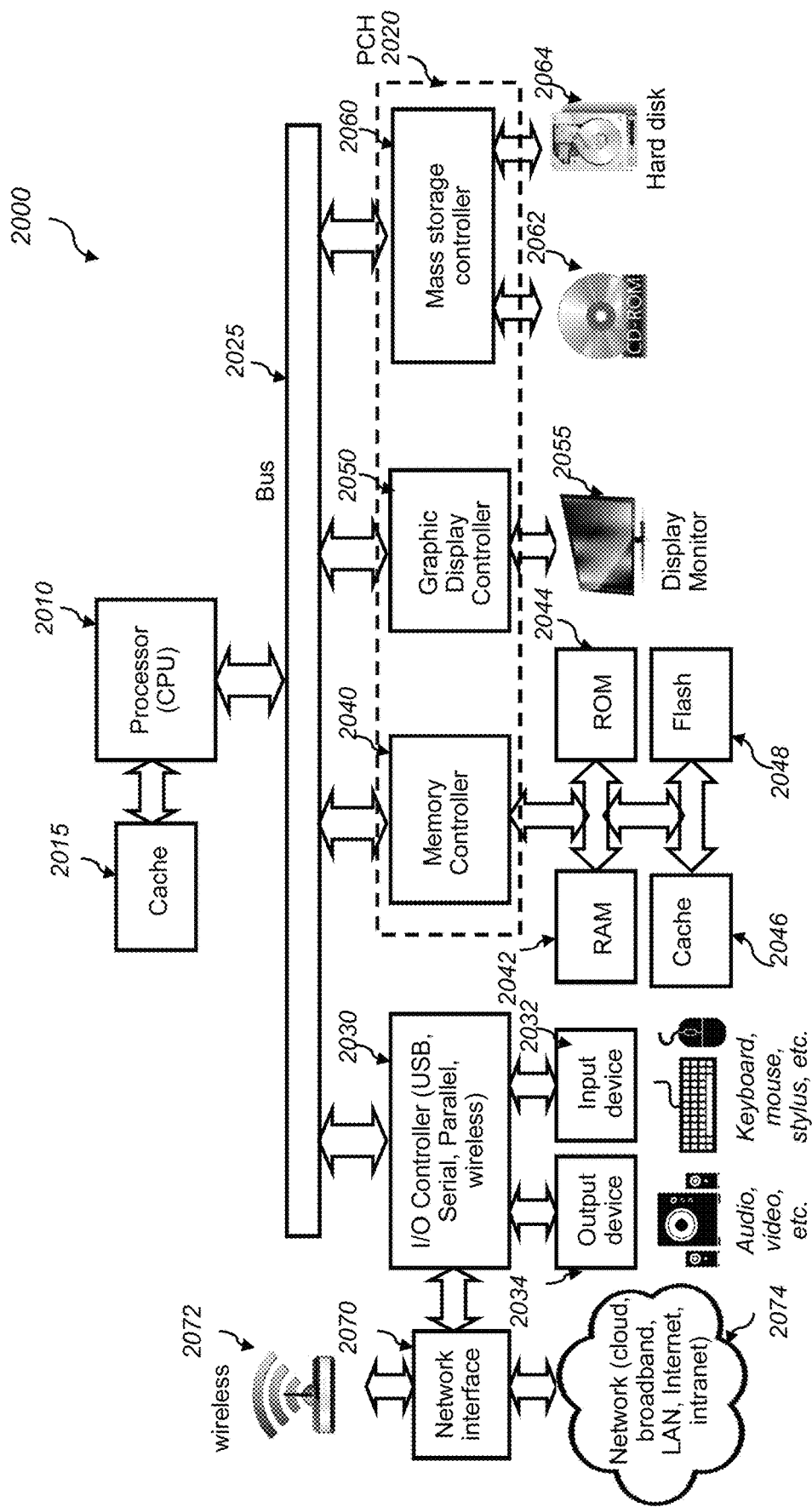
FIG. 20 is a diagram illustrating an architecture of a processor in a data transport, storage, and retrieval processing system according to one embodiment.

FIG. 20 is a diagram illustrating an architecture of a processor subsystem 2000 in a data transport, storage, and retrieval processing system according to one embodiment. The processing subsystem 2000 shown in FIG. 20 may represent the pre-storage system 220 or 1220, the post-storage processor 250 or 1250, the wavefront pre-transform circuit 1320, or the wavefront post-transform circuit 1420. Not all of the components in FIG. 20 are present for a particular processor. For brevity, the following refers to the processor subsystem 2000, but it is noted that the architecture of the processor subsystem 2000 may change depending on the particular function.

The processor subsystem 2000 includes a central processing unit (CPU) or a processor 2010, a cache 2015, a platform controller hub (PCH) 2020, a bus 2025. The PCH 2020 may include an input/output (I/O) controller 2030, a memory controller 2040, a graphic display controller (GDC) 2050, and a mass storage controller 2060. The system 1900 may include more or less than the above components. In addition, a component may be integrated into another component. As shown in FIG. 20, all the controllers 2030, 2040, 2050, and 2060 are integrated in the PCH 2020. The integration may be partial and/or overlapped. For example, the GDC 2050 may be integrated into the CPU 2010, the I/O controller 2030 and the memory controller 2040 may be integrated into one single controller, etc.

The CPU or processor 2010 is a programmable device that may execute a program or a collection of instructions to carry out a task. It may be a general-purpose processor, a digital signal processor, a microcontroller, or a specially designed processor such as one design from Applications Specific Integrated Circuit (ASIC). It may include a single core or multiple cores. Each core may have multi-way multi-threading. The CPU 2010 may have simultaneous multithreading feature to further exploit the parallelism due to multiple threads across the multiple cores. In addition, the CPU 2010 may have internal caches at multiple levels.

The cache 2015 is a first level (L1) external cache memory. It is typically implemented by fast static random access memory (RAM). Other cache levels may appear externally, such as the cache 2046. Some or all cache levels (L1, L2, and L3) may all be integrated inside the CPU 2010.

The bus 2025 may be any suitable bus connecting the CPU 2010 to other devices, including the PCH 2020. For example, the bus 2025 may be a Direct Media Interface (DMI).

The PCH 2020 in a highly integrated chipset that includes many functionalities to provide interface to several devices such as memory devices, input/output devices, storage devices, network devices, etc.

The I/O controller 2030 controls input devices (e.g., stylus, keyboard, and mouse, microphone, image sensor) and output devices (e.g., audio devices, speaker, scanner, printer). It also has interface to a network interface card 2070 which provides interface to a network 2074 and wireless controller 2072. The network interface card (NIC) 2070 transmits and receives the data packets to and from a wired, wireless network 2072 or 2074. The NIC 2070 may have one or more sockets for network cables and the type of socket depends on the type of network it will be used in. The network 2074 may be a LAN, a MAN, a WAN, an intranet, an extranet, or the Internet.

The memory controller 2040 controls memory devices such as the random access memory (RAM) 2042, the read-only memory (ROM) 2044, the cache memory 2046, and the flash memory 2048. The RAM 2042 may store instructions or programs, loaded from a mass storage device, that, when executed by the CPU 2010, cause the CPU 2010 to perform operations as described above, such as WF pre/post-transform operations. It may also store data used in the operations, including the input data stream or the output data stream. The ROM 2044 may include instructions, programs, constants, or data that are maintained whether it is powered or not. This may include the matrix coefficients used in the WF pre/post-transformation process, a catalog of switching patterns or mapping tables, etc. The cache memory 1946 may store cache data at level L2 or L3. The cache memory 2046 is typically implemented by fast static RAM to allow fast access from the CPU 2010. The flash memory 2048 may store programs, instructions, constants, tables, coefficients, mapping tables as in the ROM 2044. It may be erased and programmed as necessary.

The GDC 2050 controls the display monitor 2055 and provides graphical operations. It may be integrated inside the CPU 2010. It typically has a graphical user interface (GUI) to allow interactions with a user who may send a command or activate a function.

The mass storage controller 2060 controls the mass storage devices such as CD-ROM 2062 and hard disk 2064.

Additional devices or bus interfaces may be available for interconnections and/or expansion. Some examples may include the Peripheral Component Interconnect Express (PCIe) bus, the Universal Serial Bus (USB), etc.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EROM). Examples of firmware may include microcode, writable control store, micro-programmed structure.

When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any non-transitory medium that may store information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus comprising:
    a wavefront pre-transform processor having inputs and outputs and configured to transform input data at the inputs to output data at the outputs using a wavefront pre-processing transform;
    an input switching circuit configured to dynamically connect, based on an input mapping table configurable to change an input connection pattern, input streams to the inputs of the wavefront pre-transform processor;
    an output switching circuit configured to dynamically connect, based on an output mapping table configurable to change an output connection pattern, the output data at the outputs to transport streams;
    a controller configured to control, based on a wiping command, at least one of the input and output switching circuits to alter at least one of the input and output mapping tables such that the at least one of the input and output switching circuits is disabled for connection;
    wherein a first subset of the transport streams operates in a foreground mode available to a user and is transported for storage in remote storage sites at a network and a second subset of the transport streams operates in a background mode available to an administrator and is not transported for storage in the remote storage sites.

2. The apparatus of claim 1 wherein each of the output data is a unique linear combination of the input data.

3. The apparatus of claim 1 wherein the wavefront pre-processing transform includes one of an orthogonal matrix transform, a mathematical function of a non-orthogonal and full rank matrix transform, a Hadamard transform, and a Fourier transform.

4. The apparatus of claim 1 wherein one of the input connection pattern and the output connection pattern corresponds to a one-to-one mapping table.

5. The apparatus of claim 4 wherein the one-to-one mapping table includes one of an arbitrary predetermined pattern, a random pattern, a perfect shuffle pattern, and a butterfly pattern.

6. The apparatus of claim 1 wherein number of input streams is less than number of transport streams.

7. The apparatus of claim 1 wherein the remote storage sites include at least a cloud storage site.

8. An apparatus comprising:
    a wavefront post-transform processor having inputs and outputs and configured to transform input data at the inputs to output data at the outputs using a wavefront post-processing transform;
    an input switching circuit configured to dynamically connect, based on an input mapping table configurable to change an input connection pattern, input streams to the inputs of the wavefront post-transform processor;
    an output switching circuit configured to dynamically connect, based on an output mapping table configurable to change an output connection pattern, the output data at the outputs to retrieval streams;
    a controller configured to control, based on a wiping command, at least one of the input and output switching circuits to alter at least one of the input and output mapping tables such that the at least one of the input and output switching circuits is disabled for connection;

wherein a first subset of the input streams operates in a foreground mode available to a user and is retrieved from remote storage sites at a network and a second subset of the input streams operates in a background mode available to an administrator and is not retrieved from the remote storage sites.

9. The apparatus of claim 8 wherein each of the output data is a unique linear combination of the input data.

10. The apparatus of claim 8 wherein the wavefront post-processing transform includes one of an inverse orthogonal matrix transform, an inverse mathematical function of a non-orthogonal and full rank matrix transform, an inverse Hadamard transform, and an inverse Fourier transform.

11. The apparatus of claim 8 wherein one of the input connection pattern and the output connection pattern corresponds to a one-to-one mapping table.

12. The apparatus of claim 11 wherein the one-to-one mapping table includes one of an arbitrary predetermined pattern, a random pattern, a perfect shuffle pattern, and a butterfly pattern.

13. The apparatus of claim 8 wherein number of retrieval streams is less than number of input streams.

14. The apparatus of claim 8 wherein the remote storage sites include at least a cloud storage site.

15. A method comprising:
transforming input data at inputs of a wavefront pre-transform processor to output data at outputs of the wavefront pre-transform processor using a wavefront pre-processing transform;
dynamically connecting, based on an input mapping table configurable to change an input connection pattern, input streams to the inputs of the wavefront pre-transform processor using an input switching circuit;
dynamically connecting, based on an output mapping table configurable to change an output connection pattern, the output data at the outputs to transport streams using an output switching circuit;
controlling, based on a wiping command, at least one of the input and output switching circuits to alter at least one of the input and output mapping tables such that the at least one of the input and output switching circuits is disabled for connection;
wherein a first subset of the transport streams operates in a foreground mode available to a user and is transported for storage in remote storage sites at a network and a second subset of the transport streams operates in a background mode available to an administrator and is not transported for storage in the remote storage sites.

16. The method of claim 15 wherein each of the output data is a unique linear combination of the input data.

17. The method of claim 15 wherein the wavefront pre-processing transform includes one of an orthogonal matrix transform, a mathematical function of a non-orthogonal and full rank matrix transform, a Hadamard transform, and a Fourier transform.

18. The method of claim 15 wherein one of the input connection pattern and the output connection pattern corresponds to a one-to-one mapping table.

19. The method of claim 18 wherein the one-to-one mapping table includes one of an arbitrary predetermined pattern, a random pattern, a perfect shuffle pattern, and a butterfly pattern.

20. The method of claim 15 wherein number of input streams is less than number of transport streams.

* * * * *